(12) United States Patent
Ran

(10) Patent No.: US 6,317,686 B1
(45) Date of Patent: Nov. 13, 2001

(54) METHOD OF PROVIDING TRAVEL TIME

(76) Inventor: Bin Ran, 5744 Wilshire Dr., Fitchburg, WI (US) 53711

(*) Notice: Subject to any disclaimer, the term of this patent is extended or adjusted under 35 U.S.C. 154(b) by 0 days.

(21) Appl. No.: 09/621,063

(22) Filed: Jul. 21, 2000

(51) Int. Cl.[7] .................................................... G01W 1/00
(52) U.S. Cl. ......................... 701/210; 701/117; 701/120; 701/200; 73/178 R
(58) Field of Search .................................. 701/210, 200, 701/117, 120; 73/178 R; 702/3; 709/202, 203, 217, 218, 219; 707/10, 102, 104, 513

(56) References Cited

U.S. PATENT DOCUMENTS

| | | |
|---|---|---|
| 5,523,950 | 6/1996 | Peterson . |
| 5,559,707 | 9/1996 | DeLorme et al. . |
| 5,610,821 | 3/1997 | Gazis et al. . |
| 5,638,513 | 6/1997 | Ananda . |
| 5,654,886 | 8/1997 | Zereski, Jr. et al. . |
| 5,768,581 | 6/1998 | Cochran . |
| 5,835,755 | 11/1998 | Stellwagen, Jr. . |
| 5,913,917 * | 6/1999 | Murphy .............................. 701/123 |
| 5,940,776 | 8/1999 | Baron et al. . |
| 5,951,620 | 9/1999 | Ahrens et al. . |
| 5,960,411 | 9/1999 | Hartman et al. . |
| 5,999,882 | 12/1999 | Simpson et al. . |

(List continued on next page.)

OTHER PUBLICATIONS

U.S. Application No. 08/813,903 filed, Mar. 7, 1997 Patent # 6,209,026.
"Travlink Project Concept Definition and Preliminary System Design"—Westinghouse Electric Corporation, Apr. 1994.
Department of Transportation's—"Intelligent Transportation Systems (ITS) Projects"—U.S. Department of Transportation.
A printout from http://www.smartroute.com/press/PR–4–15–98.HTM dated May 30, 2000.
A printout from http://www.smartroute.com/press/PR–5–14–98.HTM dated May 30, 2000.
A printout from http://www.smartroute.com/press/pr–6–22–98.htm dated May 30, 2000.
A printout from http://216.91.24.20/press/pr–3–20–00.htm dated May 30, 2000.
A printout from http://www.trafficonline.com/ dated Jun. 1, 2000.

*Primary Examiner*—Tan Nguyen
*Assistant Examiner*—Olga Hernandez
(74) *Attorney, Agent, or Firm*—Lathrop & Clark LLP

(57) ABSTRACT

A traffic information system for predicting travel times utilizes Internet based collecting and disseminating of information. The system accounts for vehicle type, driver specific disposition, and its predictions of future traffic account for the effects of predictable events, particularly weather, on traffic patterns. The traffic information system includes a computer model of a transportation route map, the route map having a multiplicity of possible destinations points connected by route segments. An equation is developed for each route segment, the equation incorporating variables and constants which relate to the fixed and variable parameters which are indicative of the time it will take to travel along a particular route segment. Predicted travel time along the route segment can be improved over historical data for a time in the future for which there are reasonably accurate weather predictions. Incorporation of the effect of predicted weather on travel time over a route segment can be accomplished by developing a correlation between weather conditions and decreased traffic speeds. Personalized prediction times are generated by taking into account the vehicle type and level of agressiveness of a particular driver.

20 Claims, 13 Drawing Sheets

U.S. PATENT DOCUMENTS

| | | |
|---|---|---|
| 6,003,024 | 12/1999 | Bair et al. . |
| 6,023,653 * | 2/2000 | Ichimura et al. ................. 701/208 |
| 6,029,141 | 2/2000 | Bezos et al. . |
| 6,076,111 | 6/2000 | Chiu et al. . |
| 6,108,603 * | 8/2000 | Karunanidhi ..................... 701/208 |
| 6,122,593 * | 9/2000 | Friederich et al. ............... 701/202 |
| 6,177,873 * | 1/2001 | Cragun ............................ 340/601 |
| 6,178,380 * | 1/2001 | Millington ....................... 701/212 |
| 6,199,008 * | 3/2001 | Aratow et al. ................... 701/120 |
| 6,209,026 * | 3/2001 | Ran et al. ........................ 709/218 |

* cited by examiner

METHOD OF PROVIDING TRAVEL TIME

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to systems for predicting travel times between locations in general and more particularly relates to systems which provide information about traffic based on real-time and historic traffic data over the Internet.

Recently, many traveler information systems have been developed to inform travelers with regard to real-time traffic information. Examples of such traveler information systems can be found in several major traffic information websites, including SmartRoute Systems http://www.smartraveler.com/ (1998):

Etak http://www.etaktraffic.com/ (1997):

Traffic Station Group http://www.trafficstation.com/ (1998):

TrafficOnline System http://www.trafficonline.com (1996): and

Traffic Assist http://www.trafficassist.com/ (1998).

The travel information systems are based on the availability of reliable computer-based maps and the availability of traffic data, available over the Internet, which are typically supplied by each state's Department of Transportation. Internet provided data includes real-time velocities and the number of vehicles per minute traveling selected roads. Over time such data can also supply historical travel times between selected points. Existing systems display maps which indicate road construction or other incidents and show or predict travel time along particular routes or between selected points.

In addition to companies that provide Internet based traffic reporting and vehicle routing solutions, many other institutions, including state departments of transportation (DOT) and city departments of transportation, as well as transportation consulting companies in the US, have deployed their own traveler information systems, which use variable message signs (VMS), travel advisory radios (TAR), TV and cable TV channels, radios, kiosks, telephones, pager, and cell phone to provide traveler information to individual users.

In a typical travel information system, a road map is divided into route segments and historical and/or real-time sensor data is used to predict the time it will take a vehicle to travel along a particular route segment. Predictions of trip travel times are then based on linking together route segments to create routes along which it is desirable to calculate a travel time.

What is needed is a better system for predicting future traffic congestion based on a wider range of data including weather, and known movements to and from special events. Further, a system is needed which takes into account the attributes of the vehicle and driver in predicting trip times.

SUMMARY OF THE INVENTION

The traffic information system of this invention employs a computer model of a transportation route map, the route map having a multiplicity of possible destination points connected by route segments. Each route segment is representative of a particular path between destination points. The path may represent a road segment, but can also be used to represent other transportation links, such as airplane routes, train routes, and water transportation routes. Between any two destinations points there will typically be a number of different routes, each route being made up of one or more route segments. An equation is developed for each route segment. The equation incorporates variables and constants which relate to the fixed and variable parameters which are indicative of the time it will take to travel along a particular route segment. The fixed parameters for a road would include the route segment's length, the posted speed limit, and the carrying capacity of the route segment. Variable factors include the time of day, day of week, day of year, number of vehicles predicted or measured to be moving along the route segment, the measured velocity of the vehicles, the type of driver, and type of vehicle for which a prediction of travel time is desired. In addition, there are variables which adjust the carrying capacity of the route segment, for example lane closures due to construction or accident. The carrying capacity of a route segment as well as the maximum speed will also be dependent on weather, and other factors affecting visibility.

The number of vehicles using a given route segment will in the short run depend on the number of vehicles on other route segments which supply traffic to the different route segment. Longer-term prediction of vehicle traffic will be based on historical data and on data concerning future construction on alternative routes, and planned events which will increase traffic along the route segment.

The capacity of a route typically remains constant, until the occurrence of a predictable event, such as construction, and adverse weather, or is reduced by an unpredictable event such as an accident.

Uncertainty with respect to the time required to transit a route segment relates to the unpredictability of the future and the imperfection of knowledge about the current situation. Predictions based on a given confidence level will produce a range of trip times which will reflect the type of uncertainty and its magnitude. Future predictions of weather are given in probabilistic terms and therefore result in probabilistic predictions of future transit times.

It is an object of the present invention to provide a traffic information system which provides long-term predictions of time to transit particular route segments and multiple route segments.

It is a further object of the present invention to provide a traffic information system which can predict route segment speeds based on predicted weather.

It is another object of the present invention to provide a traffic information system which provides an estimate of the uncertainty, presently estimated or future predicted, for travel time along a route segment.

It is a yet further object of the present invention to provide a traffic information system which provides an estimate of travel time over route segments which considers the type of vehicle and the type of driver who is traversing the route segments.

Further objects, features and advantages of the invention will be apparent from the following detailed description when taken in conjunction with the accompanying drawings.

DESCRIPTION OF THE PREFERRED EMBODIMENTS

Figure 1:
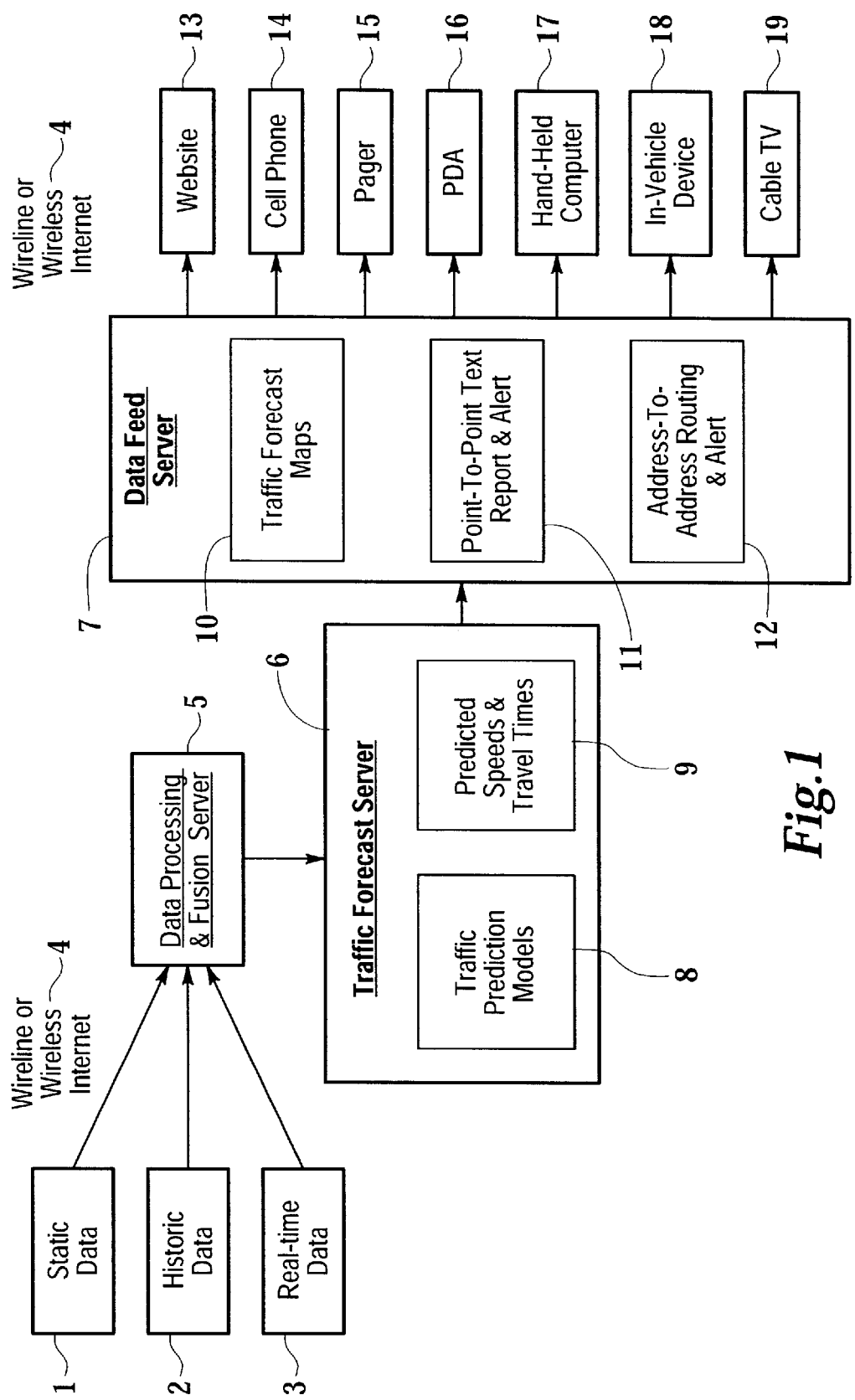
FIG. 1 illustrates the system architecture of the Internet-based traffic prediction system of this invention.

Referring more particularly to FIGS. 1–13 wherein like numbers refer to similar parts, an improved system for providing traffic routing information to individual users is disclosed.

With the advent of the interstate system of roads a new discipline, Urban Transport Planning developed in the mid '50's and became the focus of professional practice and academic research. The purpose of this discipline was to forecast urban travel demand so as to have a basis for making decisions about investment in transportation facilities. The discipline of Urban Transport Planning build on certain standard models, developed during the 1950's to predict average or steady-state conditions for transportation system usage. During the second decade following the advent of the discipline, research was directed towards addressing the mechanistic and behavioral limitations of systems developed in the 1950's. By and large these traditional concepts and methods were used through the 1980's. Even into the 1990's, where new methods were developed which considered transportation as a good subject to the laws of supply and demand, and employed the principles of microeconomics, the new methods remained largely static models of average or steady-state conditions. Dynamic models are needed to provide real-time predictions and applications, but, because of their complexity, have been slow in their development.

The individual traveler requires more than information about average or steady-state conditions on roads. Steady-state information can be useful in planning a trip where traffic congestion is not a consideration. Where traffic congestion causes significant delay, information about real-time and future conditions is needed for trip planning. Traffic reporting by radio within major metropolitan areas roughly parallels the development of the discipline of Urban Transport Planning and provides some of the real-time information about traffic congestion needed by the individual consumer of the transportation good. With the advent of the Internet it has become possible to provide information over the Internet which is customized to each individual user.

Many sources of information concerning traffic flow are available over the Internet. The information available over the Internet includes feeds from WebCams which provide real-time visual information concerning traffic levels at various points within a metropolitan area. This information can be converted by computer vision recognition systems into vehicle velocities and vehicle flow numbers. This information in turn is used by various service providers to provide real-time information about traffic along specific routes and even to provide suggestions for optimal routes between points. However, the consumer of trips, i.e. the commuter, traveler, or delivery person, is interested in information about trips which may take place/be consumed sometime in the future.

The prediction of future events can generally be divided into four categories: deterministic events which can be predicted based on the laws of physics; chaotic events where limitations imposed by chaos theory restrict the time period over which it is possible to have sufficiently detailed information on which to base predictions; and thirdly the future conditions may be determined by random events which cannot be predicted. The fourth and very useful category of future predictions is a simple extrapolation from similar historical circumstance.

The science of weather forecasting can be compared and contrasted with the difficulties of forecasting future traffic congestion. Weather is a physical system dictated by the properties of the physical atmosphere and its interaction with land, water and solar heating. With sufficient knowledge concerning the beginning states of current atmospheric conditions it is possible by means of mathematical models implemented on computers to project the physical system forward to predict future weather conditions.

Weather is however inherently a chaotic system, which means future conditions become over time infinitely sensitive to initial conditions. Weather prediction with current knowledge about initial conditions is only better than a prediction based on climate for a period of two or three days into the future. Climate is simply average conditions determined historically for a particular time of year. Weather predictions for the short run can be remarkably precise, although there remains a random component with respect to small-scale aspects of time and location. Ultimately it is random movements in the atmosphere through their effect on initial conditions which governs the weather of tomorrow, within the physical system which produces a given climate.

Forecasting traffic conditions is an inherently less deterministic system in the sense that predictions about the future based on present conditions are better than predictions based on historical average conditions based on time-of-day, day-of-week, etc., for only about one hour into the future. The improved traffic predictions system of this invention discloses how to predict what the next morning's commute will be with more precision than a prediction based on what a typical commute on a similar day would be.

Referring to the analogy of weather prediction, although chaos theory, and knowledge of initial conditions, limits weather prediction to two or three days, it is possible to make predictions months or even years into the future based on the understanding of climatology phenomena such as El Nino. Changes in ocean surface temperatures indicate a temporary change in climate, which then allows prediction of changes in rainfall, cloud cover, etc. In the same way, changes in external factors which affect travel over a system of roadways or other transportation links can be used to more accurately predict traffic in the future, and more generally to predict travel times over specific route links in the future.

The factors affecting transportation climate which can be predicted generally are factors which relate to road or route link capacity. The three major sources of abnormal congestion in order of importance are construction, weather, and traffic incidents, such as lane blockage due to accident. These factors essentially decrease capacity of routes links, and so change the expected average commute time, by increasing traffic congestion. Construction and the weather are both phenomena which can be predicted a day or more into the future.

To a lesser extent, total demand for trips on a specific route segment can be predicted where they relate to specific events, for example the scheduling of a cultural event, the closing of some roads due to construction increasing travel on other roads, etc. However, most factors relating to demand for trips will be predicted from the historical data, i.e.: when school is in session students commute to school; on Memorial Day weekend there will be a historically observed amount of vacation travel. So better predicting of travel demand will often be related to better picking of a historically analogous day. For example, where the Fourth of July falls on the weekend traffic patterns will be different than where it falls on a weekday.

Nevertheless, speed along a route segment in the future can be predicted with improved accuracy by adjusting historically expected route speed by a factor to account for a known increase in traffic due to a predicted future event. A delay factor can be developed over time for specific events by comparing historically expected traffic with actual traffic during the predicted event. In this way delay factors could be developed over time for events such as sporting events, theatrical events, or public events which would be able to take predicted traffic based on historical data and adjust expected traffic velocities to account for the known future events which are shown to have a correlation with increased traffic.

Even more useful is to predict decreased traffic velocity due to decreased capacity along a particular route segment. Construction along a route segment normally occurs at predicted times, and with a known scope, i.e. the number of lanes closed, and the length of the road segment affected, etc. As a first approximation, the amount of traffic that will try to move along a road will be the amount predicted from historical data. It is possible to project decreased traffic velocity along route segments by working from the standard road construction advisories. Such advisories may include delay factors which account for the degree of road capacity constriction, the length of the constriction, and the interaction of traffic flow with the constriction. Thus traffic at a specific future time can be predicted, when a construction event is predicted to decrease route segment capacity.

Weather is a predictable aspect of the future which can be applied to predicting the capacity of route segments to carry traffic at some time in the future. Weather is also a major cause of traffic congestion. Because weather patterns can be predicted relatively accurately for a matter of hours, and with less accuracy several days into the future, applying weather predictions to better predict future travel times along route segments results in improvements in future predicted travel times between destinations.

Figure 13:
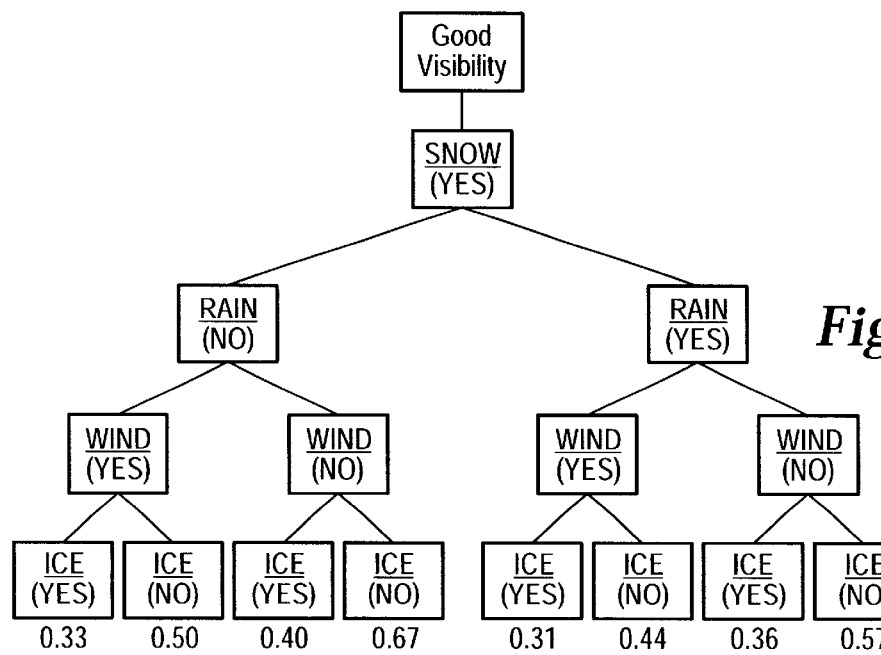
FIG. 13. illustrates the determination of weather factors which are used to predict traffic delay due to weather.

Weather forecasts are provided on the World Wide Web on a county by county basis, or by city, or zip code. To apply future weather forecasts to the prediction of future traffic conditions it is simply necessary to develop a transfer function between specific forecast variables and traffic conditions—more particularly, a transfer function between specific forecast of weather conditions such as rain and specific levels of traffic delay resulting therefrom. Such a transfer function can be developed by comparing over time the actual effect of weather on trip time. From such actual data, a lookup table for decreased traffic velocity for specific weather conditions can be developed, or a model based on how weather conditions affect the parameters of the physical model can be developed. FIG. 13 shows such a weather type effects tree, wherein for various conditions traffic velocities decrease to a determined percentage of normal for a particular time of day and day of the week.

Typical forecast systems do not consider the particularity of the individual vehicle or of the individual driver. The typical traffic forecast system assumes that everyone moves with the flow of traffic, and therefore averaged traffic flow numbers are representative of the time for individual drivers to complete a particular route segment. However on many routes the speed limit for different types of vehicles many differ—often trucks are not allowed to travel as rapidly as cars, for example. Further, the handling and acceleration characteristics of different vehicles may mean a particular type of vehicle is less capable of exceeding the average speed of the traffic flow. Perhaps the most important factor, beyond the varying speed limit set by law between trucks and cars, is the aggressiveness of the driver. Some drivers are content to minimize driving effort by simply maintaining a set position behind another vehicle. Other drivers actively pursue a course of action designed to maximize safety, such as avoiding groups of vehicles which are closely spaced, yet other drivers attempt to maximize speed, frequently passing cars which impede the flow of traffic.

Some drivers are regular commuters along a route and with little effort will make those lane changes necessary to optimize travel time by avoiding traffic slowdowns caused by on-ramps and off-ramps. Because regular commuters must spend less effort considering their route and observing the particularities of a route segment, they can spend more time and effort analyzing traffic and avoiding traffic congestion. The performance of a particular driver can be categorized over time by a coefficient particular to an individual driver, or each driver can self-assess, choosing an appropriate category, with respect to driving style. By comparing expected travel times based on traffic flow data with actual travel times for a particular individual, over time a coefficient could be developed, specific to that individual and even specific to various routes such as the route along which an individual typically commutes.

Therefore an improved prediction of travel time along a particular route for a particular individual can be achieved by applying vehicle and driver specific factor to historical or real-time data. When predicting the future, vehicle and drivers specific factors generally are multiplicative.

Other factors such as those used to account for predicted adverse weather are also generally multiplicative, whereas other factors may be in the form of (1−f) where f is a parameter between zero and one. This approach is used when two mutually exclusive factors are combined to predict trip time such as real-time vs. historical traffic flow data. The factor f can be determined by statistical, empirical, heuristic, or model based analysis.

1. Traffic Prediction Models

A simple statistical model can be built for predicting travel speed on a route segment. It follows that:

Predictive_Speed=Historical_Speed*b+Current_Speed*(1−b)+Random Error where:

Predictive_Speed is the predictive value in future time instant t;

Historical_Speed is the historical average at the same time instant t for the same type of day;

Current_Speed is the real-time speed measured using field devices;

b is a weighting parameter;

Random Error is an error term for the speed prediction.

In real-world applications, the historical_speed is typically available and the current_speed may or may not be available. Thus, the major work for traffic prediction model calibration is to estimate the value of the weighting parameter b and the random error distribution.

EXAMPLE 1

Speed Prediction on an Urban Segment on I-90 in Chicago

For an urban segment, the weighting parameter b is affected by the traffic flow, traffic control, route segment capacity, incident, construction, and event on this route segment, and upstream and downstream segments. This weighting parameter b is to be determined using regression based on the observed values and the predictive values. The current_speed for an urban interstate segment is typically available in major metropolitan areas.

EXAMPLE 2

Speed Prediction on a Rural Segment on I-94 from Milwaukee to Madison

For a rural segment, the weighting parameter b is mainly affected by the incident, construction, and event on this route segment. This weighting parameter b is to be determined using regression based on the observed values and the predictive values. For a rural segment, the current_speed is typically not available due to the lack of detection and sensing devices on rural highways.

TABLE 1

Relationship of Impacting Factors and Variables for Short-Term (0–60 Minutes) Traffic Prediction

| Terms in Predictive Travel Time Formula | | Cruise Time | Delay | Random Error | RandomError or $\zeta$ |
|---|---|---|---|---|---|
| Traffic Flow/Demand | Real-Time Data | | Large impact | Large impact | |
| | Historical Data | | Small impact | Small impact | |
| Traffic Control | Real-Time Data | | Large impact | Large impact | |
| | Historical Data | | Small impact | Small impact | |
| Roadway Classification & Max Capacity | | Large impact | Large impact | | |
| Incident | Real-Time Data | | Large impact | Large impact | |
| | Historical Data | | | | |
| Construction | Real-Time Data | Reduce cruise speed | Large impact | Large impact | |
| | Planned | Reduce cruise speed | Large impact | Large impact | Large impact |
| Event | Real-Time Data | | Large impact | Large impact | |
| | Scheduled | | Large impact | Large impact | Large impact |
| Weather Report | Real-Time Data | Reduce cruise speed | Large impact | Large impact | |
| | Forecast | Reduce cruise speed | Large impact | | Large impact |
| Vehicle Type | Real-Time Data | Medium impact | Medium impact | | |
| | Historical Data | Medium impact | Medium impact | | |
| Composition of Different Types of Vehicles | Real-Time Data | Medium impact | Medium impact | Medium impact | |
| | Historical Data | Medium impact | Medium impact | Medium impact | |
| Driver Behavior | Real-Time Data | Medium impact | Medium impact | Medium impact | |
| | Historical Data | Medium impact | Medium impact | Medium impact | |
| Composition of Different Types of Drivers | Real-Time Data | Medium impact | Medium impact | Medium impact | |
| | Historical Data | Medium impact | Medium impact | Medium impact | |

TABLE 2

Relationship of Impacting Factors and Variables for Mid-Term (1–3 Hours) Traffic Prediction

| Terms in Predictive Travel Time Formula | | Cruise Time | Delay | Random Error | Random Error $\zeta$ |
|---|---|---|---|---|---|
| Traffic Flow/ Demand | Real-Time Data | | Diminishing impact | Diminishing impact | |
| | Historical Data | | Large impact | Large impact | |
| Traffic Control | Real-Time Data | | Diminishing impact | Diminishing impact | |
| | Historical Data | | Large impact | Large impact | |
| Roadway Classification & Max Capacity | | Large impact | Large impact | | |
| Incident | Real-Time Data | | Diminishing impact | Diminishing impact | |
| | Historical Data | | Minor impact | Minor impact | |
| Construction | Real-Time Data | Diminishing impact | Diminishing impact | Diminishing impact | |
| | Planned | Reduce cruise speed | Large impact | | Large impact |
| Event | Real-Time Data | | Diminishing impact | Diminishing impact | |
| | Scheduled | | Large impact | | Large impact |
| Weather Report | Real-Time Data | Diminishing impact | Diminishing impact | Diminishing impact | |
| | Forecast | Reduce cruise speed | Large impact | | Large impact |
| Vehicle Type | Real-Time Data | | | | |
| | Historical Data | Medium impact | Medium impact | | |
| Composition of Different Types of Vehicles | Real-Time Data | | | | |
| | Historical Data | Medium impact | Medium impact | Medium impact | |
| Driver Behavior | Real-Time Data | | | | |
| | Historical Data | Medium impact | Medium impact | Medium impact | |
| Composition of Different Types of Drivers | Real-Time Data | | | | |
| | Historical Data | Medium impact | Medium impact | Medium impact | |

TABLE 3

Relationship of Impacting Factors and Variables for Long-Term (>3 Hours) Traffic Prediction

| Terms in Predictive Travel Time Formula | | Cruise Time | Delay | Random Error | Random Error $\zeta$ |
|---|---|---|---|---|---|
| Traffic Flow/ Demand | Real-Time Data | | | | |
| | Historical Data | | Large impact | Large impact | |
| Traffic Control | Real-Time Data | | | | |
| | Historical Data | | Large impact | Large impact | |
| Roadway Classification & Max Capacity | | Large impact | Large impact | | |
| Incident | Real-Time Data | | | | |
| | Historical Data | | Minor impact | Minor impact | |
| Construction | Real-Time Data | | | | |
| | Planned | Reduce cruise speed | Large impact | Large impact | Large impact |
| Event | Real-Time Data | | | | |
| | Scheduled | | Large impact | Large impact | Large impact |
| Weather Report | Real-Time Data | | | | |
| | Forecast | Reduce cruise speed | Large impact | Large impact | Large impact |

TABLE 3-continued

Relationship of Impacting Factors and Variables for Long-Term (>3 Hours) Traffic Prediction

| Terms in Predictive Travel Time Formula | | Cruise Time | Delay | Random Error | Random Error ζ |
|---|---|---|---|---|---|
| Vehicle Type | Real-Time Data Historical Data | Medium impact | Medium impact | | |
| Composition of Different Types of Vehicles | Real-Time Data Historical Data | Medium impact | Medium impact | Medium impact | |
| Driver Behavior | Real-Time Data Historical Data | Medium impact | Medium impact | Medium impact | |
| Composition of Different Types of Drivers | Real-Time Data Historical Data | Medium impact | Medium impact | Medium impact | |

1. Background of Traffic Speed and Travel Time Estimation Models

The traffic speed on a route segment is a function of the following variables: number of vehicles or vehicle density, route segment capacity, compositions of different vehicles and drivers in traffic stream, and driver behavior. The compositions of different vehicles and drivers are determined by the percentages of different types of vehicles (car, van, bus, truck) and percentages of different types of drivers (aggressive, neutral, conservative) in the traffic stream on the route segment. Based on the vehicle density, Greendshields proposed the following fundamental speed-density relationship for a freeway segment:

$$V = V_o(1 - D/D_j) \quad (1)$$

where V: speed (vph)

$V_o$: freeflow speed based on the route segment classification (vph)

D: density or number of vehicles per mile (vehicles/mile)

$D_j$: jam density or maximum number of vehicles per mile (vehicles/mile)

The above model captures the impact of some of the major variables—the vehicle density and the capacity (jam density). But it ignores the impact of compositions of different vehicles and drivers in traffic stream, and driver behavior. In addition, it ignores the stochastic variation due to uncertainty on route segments, such as weather and event.

For an arterial segment, a closed-form formula similar to the above is not available. Because the driving speed on an arterial segment is different from location to location due to the fact that the segment portion with traffic control has slower speeds in general. Therefore, a travel time formula can be developed and an average driving speed can be derived using the travel time and driving distance.

For a general route segment, the following general travel time formula can be developed:

$$T = \alpha T_1 + \beta T_2 \quad (2)$$

where $T_1$: cruise time without congestion (seconds)

$T_2$: delay due to congestion and traffic control (seconds)

α: parameter affecting cruise time on route segment

β: parameter affecting delay on route segment

The cruise time $T_1$ can be computed using the cruise speed, which is determined based on the functional classification of route segments. For different types of route segments, the formulae for computing delay $T_2$ are different. For a freeway segment, the following formula can be developed:

$$T_2 = T_o(D/D_j)^m \quad (3)$$

where $T_2$: delay (seconds)

$T_o$: parameter to be calibrated (seconds)

D: density or number of vehicles per mile (vehicles/mile)

$D_j$: jam density or maximum number of vehicles per mile (vehicles/mile)

m: integer parameter

For an arterial segment, the following formula can be developed:

$$T_2 = \beta_1 d_1 + \beta_2 d_2 \quad (4)$$

where $T_2$: delay (seconds)

$d_1$: delay due to traffic signal cycle effects (seconds)

$d_2$: delay due to oversaturation of vehicles on segment (seconds)

$\beta_1$: adjustment parameter to account for vehicle progression on segment $\beta_2$: adjustment parameter to account for filtering effect by traffic signal The delay $d_1$ due to traffic signal cycle effects is determined using a Webster formula (1958) as follows:

$$d_1 = \frac{0.5c[1 - g/c]^2}{1 - \rho \cdot g/c} \quad (5)$$

where c: traffic signal cycle length (seconds)

g: effective green time of traffic signal (seconds)

ρ: degree of saturation at segment downstream, and $$\rho = u/\mu$$

where u: vehicle flow rate arriving at segment downstream (vehicles/second)

μ: queue discharging capacity at segment downstream (vehicles/second)

The delay $d_2$ due to oversaturation can be computed using the following formula:

$$d_2 = x/\mu \quad (6)$$

where x: number of queuing vehicles arriving at segment downstream (vehicles)

μ: queue discharging capacity at segment downstream (vehicles/second)

2. Predictive Travel Time Formula and Impacting Factors

For a typical route segment, the following travel time formula can be used for prediction purpose:

$$T = \alpha T_1 + \beta T_2 + \epsilon \tag{7}$$

where $\epsilon$: random error.

The above travel time formula can be applied for the entire vehicle flows in the segment or can be applied for an individual vehicle or driver.

A simple statistical model can be built for predicting travel time on a route segment. It follows that:

$$T^P = T^H * \theta + T^R * (1-\theta) + \xi \tag{8}$$

where:

$T^P$: predictive value in future time instant t;

$T^H$: historical average at the same time instant t for the same type of day;

$T^R$: real-time value measured using field devices;

$\theta$: weighting parameter;

$\xi$: random error term for prediction.

The historical average and real-time value can be computed using the travel time formula (7) based on historical data or real-time data, respectively. It follows that $$T^H = \alpha^H T_1^H + \beta^H T_2^H + \epsilon^H \tag{9}$$

$$T^R = \alpha^R T_1^R + \beta^R T_2^R + \epsilon^R \tag{10}$$

where the superscripts H and R indicate the historical values and real-time values of respective variables. The random error term $\xi$ accounts for errors, which can not be captured by historical data and real-time data. Substituting equation (9) and (10) into equation (8) and re-arranging the terms, it follows that $$T^P = \theta \alpha^H T_1^H + (1-\theta)\alpha^R T_1^R + \theta \beta^H T_2^H + (1-\theta)\beta^R T_2^R + \theta \epsilon^H + (1-\theta)\epsilon^R + \xi \tag{11}$$

For simplicity, the above formula is rewritten as follows:

$$T^P = T_1^P + T_2^P + \epsilon^P + \xi \tag{12}$$

where $T_1^P$: predictive cruise time and $T_1^P = \theta \alpha^H T_1^h + (1-\theta)\alpha^R T_1^R$ $T_2^P$: predictive delay and $T_2^P = \theta \beta^H T_2^H + (1-\theta)\beta^R T_2^R$ $\epsilon^P$: predictive error due to historical and real-time data $$\epsilon^P = \theta \epsilon^H + (1-\theta)\epsilon^R$$

$\xi$: predictive error due to predictive data, such as weather and event

In real-world applications, the historical travel time is typically available or computable and the real-time travel time may or may not be available or computable. Thus, the major work for traffic prediction model calibration is to estimate the value of the weighting parameter $\theta$, the discounting parameters $\alpha^R$, $\alpha^H$, $\beta^R$ and $\beta^H$, and the distributions of random errors $\epsilon^P$ and $\xi$.

In general, the major factors affecting the traffic speed or the travel time prediction include: traffic flow/demand, traffic control, route segment classification/capacity, incident, construction, event, weather, vehicle type, composition of different types of vehicles, driver behavior, and composition of different types of drivers. Tables 1–3 summarize the impact of the above factors on key variables—predictive cruise time $T_1^P$ and delay $T_2^P$ as well as random errors $\epsilon^P$ and $\xi$. This table also differentiates the prediction time intervals as short-term (0–60 minutes), mid-term (1–3 hours) and long-term (>3 hours). The availability of data corresponding to the above factors and how these data affect the traffic prediction are also illustrated in this table.

Short-Term Prediction

All the real-time data have the largest impact on the travel time prediction for short-term purposes. On the other hand, the historical data and predictive data have relatively small impact. This fact is reflected using a small weighting factor $\theta$ for historical travel time. Specifically, the real-time data of traffic flow/demand and traffic control affect the predictive delay $T_2^P$ and random error $\epsilon^P$ significantly by directly changing the values of $T_2^P$. The historical data of traffic flow/demand and traffic control have a small impact on the predictive delay $T_2^P$ and random error $\epsilon^P$ by directly changing the values of $T_1^P$. The route segment classification determines the predictive cruise speed and cruise time $T_1^P$ directly and the maximum capacity has a large impact on the predictive delay $T_2^P$ by changing the values of $T_2^R$ and $T_2^H$.

The real-time incident data have a significant impact on predictive delay $T_2^P$ and random error $\epsilon^P$ due to its effect on route segment capacity reduction (changing the values of $T_2^R$ and $T_2^H$ directly or reducing the discounting parameters $\beta^R$ and $\beta^H$) and uncertainty for its duration and clearance time. The real-time and predictive data of both construction and event have similar impact on predictive delay $T_2^P$ and random error $\epsilon^P$. The real-time and predictive data of construction and event increase the values of $T_2^R$ and $T_2^H$ directly or the discounting parameters $\beta^R$ and $\beta^H$ for delay estimation, respectively. However, the real-time and planned construction activities also significantly reduce the cruise speed so as to increase the predictive cruise time $T_1^P$. Specifically, the discounting parameters $\alpha^R$ and $\alpha^H$ are further increased based on real-time and planned construction activities, respectively.

Similarly, the real-time and forecast data of adverse weather increase the discounting parameters $\alpha^R$ and $\alpha^H$ respectively so as to reduce the cruise speed and increase the predictive cruise time $T_1^P$. Furthermore, the real-time and forecast data of adverse weather increase the discounting parameters $\beta^R$ and $\beta^H$ for delay estimation respectively so as to increase the predictive delay $T_2^P$. The uncertainty of weather reports and forecast contribute significantly to the prediction random error $\xi$. For example, an icy snow will reduce the cruise speed, the friction between pavement and vehicle, and the visibility. Thus, it will worsen the congestion and increase the delay so that both the predictive cruise time $T_1^P$ and the predictive delay $T_2^P$ will be increased. In the mean time, the uncertainty on when the icy snow will stop adds to the uncertainty of travel time prediction into the future.

For traffic prediction for an individual driver and the entire traffic stream on a route segment, the vehicle type and driver behavior data directly affect the discounting parameters $\alpha^R$ and $\alpha^H$ so as to affect the cruise speed and the predictive cruise time $T_1^P$. For example, a heavy truck has a slower cruise speed than a car, which means that the discounting parameters $\alpha^R$ and $\alpha^H$ for a heavy truck are larger than for a car. Furthermore, an aggressive driver has a much faster cruise speed than a conservative driver on a light-congested freeway segment, which means that the discounting parameters $\alpha^R$ and $\alpha^H$ for an aggressive driver are smaller than for a conservative driver.

The vehicle type and driver behavior data directly affect the discounting parameters $\beta^R$ and $\beta^H$ for delay estimation so as to affect the predictive delay $T_2^P$. For instance, a bus has frequent stops and passenger loading and unloading on urban streets. Thus, its discounting parameters $\beta^R$ and $\beta^H$ are larger than the discounting parameters $\beta^R$ and $\beta^H$ for cars on urban street segments. Even on congested route segments, an aggressive driver tends to find empty spacing in the traffic stream whenever he/she can so that he/she has shorter delay than a conservative driver does. Thus, the discounting parameters $\beta^R$ and $\beta^H$ for an aggressive driver are smaller than the discounting parameters $\beta^R$ and $\beta^H$ for a conservative driver.

The compositions of different types of vehicles and drivers also affect the predictive cruise time and delay. For instance, a traffic stream with a large percentage of trucks has a slower cruise speed, longer cruise time, and longer delay than a traffic stream with a small percentage of trucks. Thus, the discounting parameters $\alpha^R$, $\alpha^H$, $\beta^R$ and $\beta^H$ for a traffic stream with a large percentage of trucks are larger than the discounting parameters for a traffic stream with a small percentage of trucks.

The stochasticity of driver behavior and the random composition of different types of vehicles and drivers contribute to the random error $\epsilon^P$ for traffic prediction. For example, the aggressiveness of drivers in a traffic stream follows a stochastic distribution, which adds to the random error $\epsilon^P$ for traffic prediction.

Mid-Term Prediction

All the real-time data have diminishing impact on the travel time prediction for mid-term purposes. On the other hand, the historical data and predictive data have relatively larger impact. This fact is reflected by using a larger weighting factor $\theta$ for historical travel time.

Long-Term Prediction

All the real-time data become historical data and have no direct impact on the travel time prediction for long-term purposes. On the other hand, the historical data and predictive data have the largest impact. This fact is reflected by using a weighting factor $\theta=1$ for historical travel time.

Uniqueness of this invention on travel time prediction models can be summarized as follows:

1. Significantly improved prediction model for vehicle flows by considering the impact of weather and event.
2. Personalized prediction model, which can be applied to individual driver and vehicle by considering the vehicle type and driver behavior.
3. Random Errors in Traffic Prediction There are two types of random errors identified in the travel time prediction model: (1) predictive error $\epsilon^P$ due to historical and real-time data, and (2) predictive error $\xi$ due to predictive data, such as weather and event. The major factors affecting the travel time prediction have different impact on these random errors.

Impact of Weather

The impact of weather on random errors in traffic prediction is mainly reflected in its impact on the predictive error $\xi$ due to weather forecast data. Since the weather forecast is accompanied by forecast probability, this probability will affect the distribution of $\xi$. For a weather forecast with high accuracy and probability, the variance for traffic prediction will be small and the travel time prediction will be generated with high accuracy and probability.

The impact of weather on traffic prediction is considered using the following equation: Predictive_Speed=Original_Predictive_Speed*Weather_Factor+Random Error where:

Predictive_Speed is the final predictive value by considering the weather impact;

Original_Predictive_Speed is the speed value predicted using all other factors;

Weather_Factor is a discounting parameter due to the weather effect;

Random Error is an error term for the speed prediction due to the weather effect.

Using historical speed data and corresponding weather information, the weather factor can be calibrated for various types of weather combinations. A weather matrix is created to represent the weather combinations. The random error is given by a random number generator, which is typically assumed as having a normal distribution. The maximum value of the random error is constrained by the range of feasible speed change due to weather changes, which could be a percentage of the original predictive speed. The mean of the random error is assumed as 0 and its variance is constrained by the probability of weather forecast. If the probability of weather forecast is high, the variance of the random error is small and vice versa.

Four types of weather conditions are defined as standard conditions in the database schema—rain, wind, snow, and ice. These four types of conditions are again classified based on visibility: good visibility, reduced visibility (<100 m), and severely reduced visibility (<50 m). All the weather forecast messages are converted into the above standard combinations. The weather factors are then determined using regression based on measured travel speeds and predictive travel speeds. An example of the weather factors is shown in FIG. 13.

The weather report and forecast data are typically available zone by zone. To apply the weather report and forecast data for travel speed prediction, the same weather adjustment factors will be applied to all the route segments in the same weather report zone. See FIG. 13.

Impact of Incident, Construction, and Event

The real-time data on incident, construction, and event affect the prediction error $\epsilon^P$ due to real-time data. Specifically, the incident clearance time and reduction of route capacity and travel time have large uncertainty, which contribute to the prediction error $\epsilon^P$. The lane closure and reduction of route capacity and travel time due to construction and event are also random and this fact should be reflected by prediction error $\epsilon^P$.

Furthermore, the future lane closure and reduction of route segment capacity and travel time due to planned construction and scheduled event have a larger uncertainty and this fact should be reflected by prediction error $\xi$.

Impact of Driver Behavior

The driver behavior affects the travel time prediction for individuals significantly. The wide distribution of driver aggressiveness contributes to the prediction error $\epsilon^P$. Of course, the aggregate driver behavior affects the travel time prediction for route segments significantly as well and this fact should be reflected using the prediction error $\epsilon^P$. Furthermore, the driver behavior changes from time to time, from place to place, and from driver to driver. This fact should be reflected using the prediction error $\epsilon^P$.

Impact of Vehicle and Driver Composition in Traffic Stream

The random distribution of vehicle and driver composition in a traffic stream causes the travel time prediction to be less uncertain and this randomness should be reflected using the prediction error $\epsilon^P$. The vehicle and driver compositions in a traffic stream tend to change with time, location and highway segment, and are highly stochastic. This will affect the travel time prediction error $\epsilon^P$ to some extent.

The objective of this invention is to provide an Internet-based traffic prediction system and personalized traffic prediction and trip decision support system for travelers to make intelligent decisions before and during their trips. Another objective of this invention is to expand the Internet-based traffic prediction system and personalized traffic prediction and trip decision support system to the applications in a multi-modal transportation network.

As shown in FIG. 1, the Internet-based traffic prediction system has a data processing and fusion server 5, a traffic forecast server 6, and a data feed server 7. The data processing and fusion server 5 uses wireline or wireless internet 4 and communications network to retrieve static data 1, historical data 2, and real-time data 3. With the input databases from the data processing and fusion server 5, the traffic forecast server 6, uses one or a plurality of traffic prediction models 8 to generate predicted speeds and travel times 9 for a route segment network.

The predicted speeds and travel times 9 are then used to produce various types of customized traffic forecast products, including traffic forecast maps 10, point-to-point text report and alert 11, and address-to-address routing and alert 12. At the data feed server 7, the data feeds are customized for different applications and different devices. For instance, some of the data feeds need to be created using XML and WAP standards for wireless applications. Subsequently, these customized traffic forecast products and data services are then sent to users via various types of devices and wireline or wireless Internet 4. These devices include website 13, cell phone 14, pager 15, PDA 16, hand-held computer 17, in-vehicle device 18, and cable TV 19. It should be noted, of course, that the traffic forecast products and data services can be used via other types of user devices, which are either available today or will be developed in the future.

Figure 2:
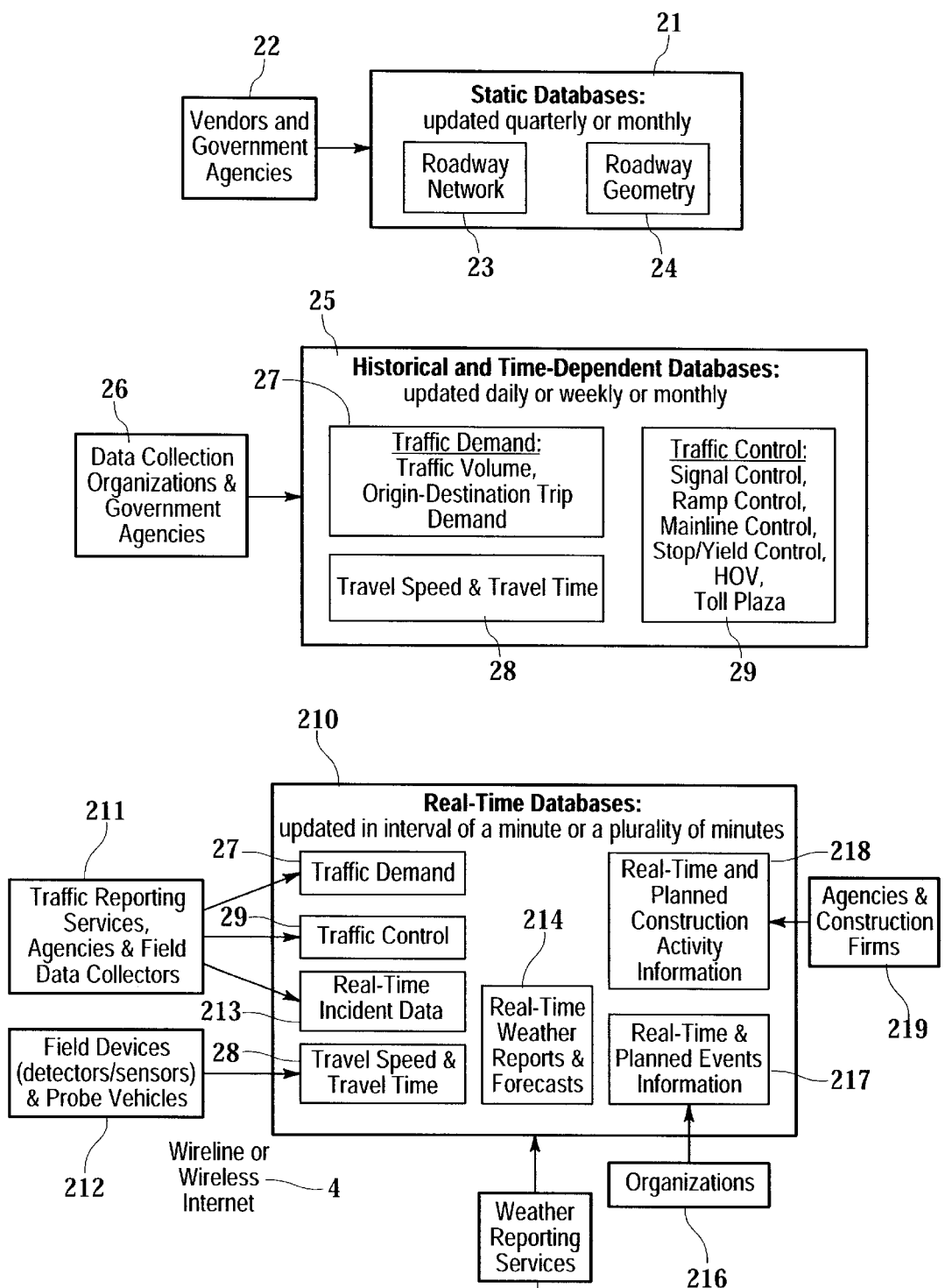
FIG. 2 summarizes the input databases and corresponding data sources for Internet-based traffic prediction and forecast in accordance with an embodiment of the present invention.

The input databases and data sources are further illustrated in FIG. 2. Basically, the input databases include three types of major databases: static databases 21, historical and time-dependent databases 25, and real-time databases 210. The static databases 21 define the route segment network 23—node, link, node coordinate, link length, address, route segment classification, speed limit, driving restriction, facility, landmark, etc., and route segment geometry 24—number of lanes, intersection layout, interchange layout, road curvature, vertical/horizontal alignment, etc. These databases are typically available from map database vendors and government agencies 22, such as NavTech, GDT, and US Department of Transportation. The static databases 21 are typically updated quarterly or monthly.

The historical and time-dependent databases 25 mainly comprise three types of databases: traffic demand 27, travel speed and travel time 28, and traffic control 29. The traffic demand 27 database typically includes traffic volumes on route segments, trip generation at origin, trip attraction at destination, and origin-destination trip demand. The travel speed and travel time 28 database provides the historical information for different time of day and day of week. The traffic control 29 database stores the information on signal control, ramp control, freeway mainline control, stop/yield control, HOV control and toll plaza control. The historical and time-dependent databases 25 are generated mainly based on the input of data collection organizations and government agencies 26, and are updated daily or weekly or monthly, depending on the data availability at different locations.

The real-time databases 210 comprise seven major databases: traffic demand 27, traffic control 29, real-time incident 213, travel speed and travel time 28, real-time weather reports and forecasts 214, real-time and planned events information 217, and real-time and planned construction activity information 218. These real-time databases are typically updated in intervals of a minute or a plurality of minutes by retrieving data from various sources via wireline or wireless Internet 4. The real-time data of traffic demand 27, traffic control 29, and incident 213 are typically provided by traffic reporting services, agencies and field data collectors 211. The real-time travel speed and travel time 28 data are directly measured using field devices 212, such as directors and sensors, or provided by probe vehicles 212. Moreover, the real-time weather reports and forecasts 214 are available from weather reporting services 215. The real-time and planned events information 217 is available from various public and private organizations 216, and the real-time and planned construction activity information 218 is typically available from transportation agencies and construction firms 219.

Figure 3:
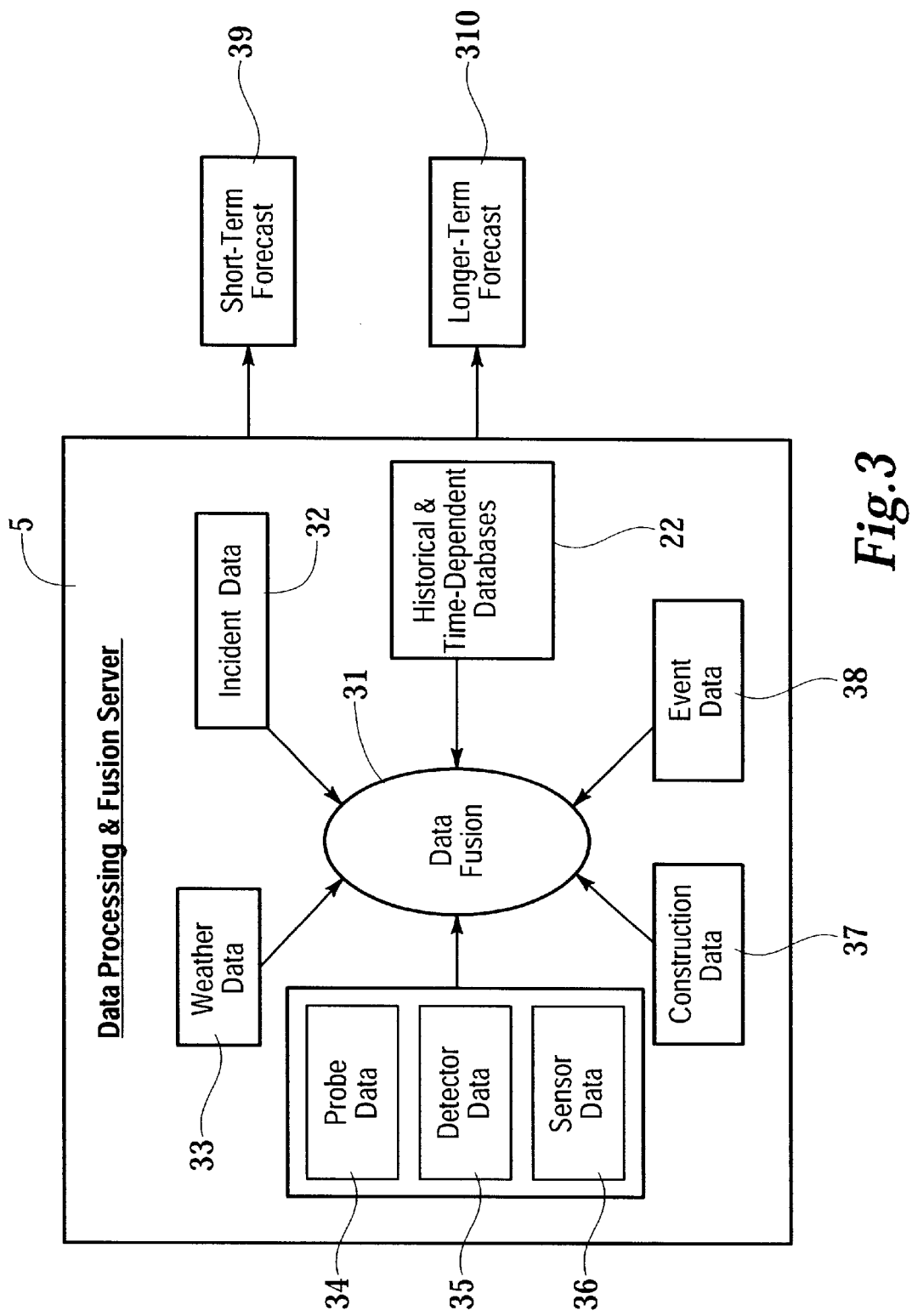
FIG. 3 shows the data fusion process and how to integrate the real-time data in accordance with an embodiment of the present invention.

In order to create a reliable data stream for traffic prediction models, a data fusion 31 process is needed. FIG. 3 illustrates the data fusion 31 process and how to integrate the real-time data for traffic prediction. This data fusion 31 process works closely with the traffic prediction models 8 in order to generate accurate traffic prediction. The historical and time-dependent databases 22 are used as the basis for data fusion 31. The historical travel time and speed data are generated for each route segment and each time of day, day of week, week of month, and month of year. All other real-time data are fused to create a more accurate basis for short-term forecast 39 and longer-term forecast 310. The data fusion 31 could use various types of models, including weighted average and fuzzy logic.

Specifically, the real-time probe data 34, detector data 35, and sensor data 36 are used as the major basis to update the current travel time and travel speed estimates and short-term forecast over the next 30–60 minutes. The real-time incident data 32 is used to provide the basis for the estimate and prediction of route segment capacity reduction and speed reduction over the next few hours until the impact of incidents, such as shock wave on freeways, are cleared. Similarly, the real-time weather data 33 and weather forecast are used as the basis for the estimate and prediction of route segment capacity reduction and speed reduction during the entire period of traffic prediction, which typically ranges from a plurality of minutes to a plurality of days. The real-time construction data 37 and planned construction activities as well as the event data 38 are used in similar fashion to estimate and predict route segment capacity reduction and speed reduction during the entire period of traffic prediction.

Figure 4A:
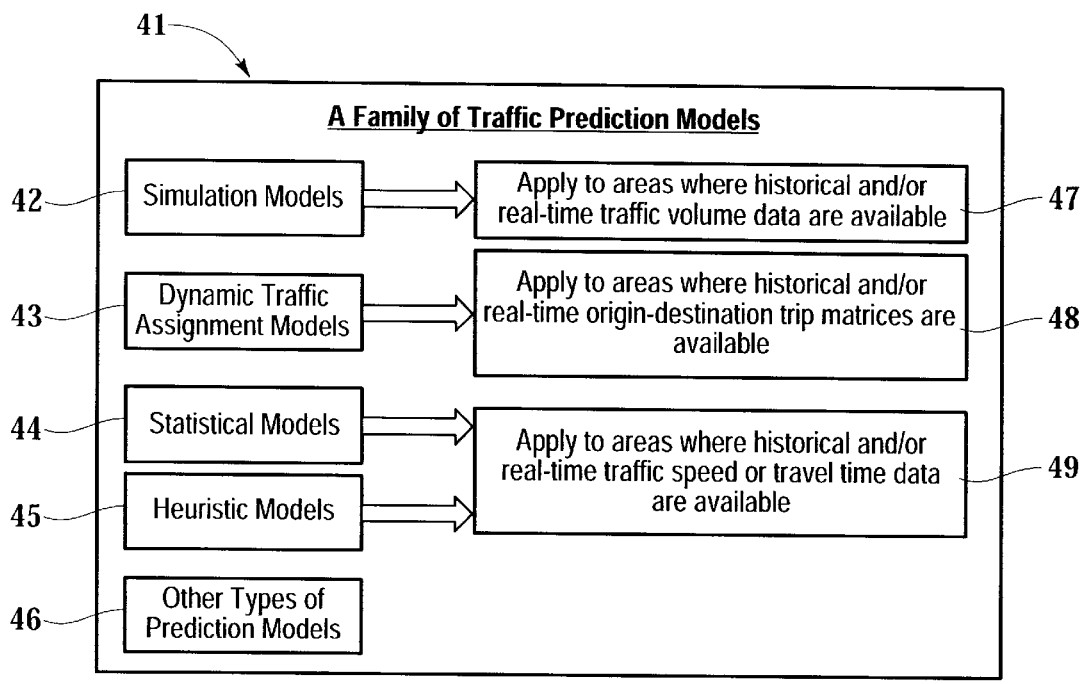
FIG. 4A illustrates a family of traffic prediction models.

FIG. 4A illustrates a family of traffic prediction models 41 and how they can be used for estimation and prediction of time-dependent travel times and speeds.

There are at least four types of prediction models available: 1) simulation models 42, 2) dynamic traffic assignment models 43, 3) statistical models 44, and 4) heuristic models 45. Simulation models 42 typically represent each vehicle as an entity and use pseudo random numbers to predict speeds and travel times once traffic flow volumes have been predicted or collected by other means. The simulation models 42 are typically applied to areas where historical and/or real-time traffic volume data are available 47. The dynamic traffic assignment models 43 are to determine the dynamic trajectories of link flows and travel times at each instant of time resulting from drivers using routes based on some route choice criteria, given the time-dependent origin-destination (O-D) departure rate requirements. The dynamic traffic assignment models 43 are typically applied to areas where historical and/or real-time origin-destination trip matrices are available 48.

The statistical models 44 use information on flow conditions in the immediate past to estimate future values of travel time and flow. Statistical models predict traffic flow characteristics by identifying regularities in traffic flows and traffic flow patterns over time. The heuristic models 45 are similar to the statistical models except that heuristical rules are used for the prediction of flow variables instead of formal statistical models. The statistical models 44 and the heuristic models 45 are typically applied to areas where historical and/or real-time traffic speed or travel time data are available 49. Other types of prediction models 46 are also useful when neither of the above prediction models can be applied. Moreover, one or a plurality of these traffic prediction models 8 are sometimes used simultaneously for an area in order to generate a set of traffic predictions which can be verified against each other.

The traffic prediction models 8 have two roles: 1) generate estimates of route segment speeds and travel times for the current time instant, and 2) produce prediction of route segment speeds and travel times for future time instants. Currently, the real-time speed and travel time data collected from field devices and probe vehicles only cover a small portion of the entire route segment network, typically major freeway segments in major urban areas. On the other hand, the historical speed and travel time data cover a larger portion of the entire route segment network, typically freeway segments and arterials. Moreover, such historical speed and travel time data are not available for each time of day, day of week, week of month, and month of year. Nevertheless, a significant part of the route segment network will have no historical speed and travel time data. Such route segments include some rural freeways, minor arterials, surface streets, and residential streets. Therefore, it is the role to use the traffic prediction models to estimate the time-dependent travel times and speeds for each route segment for each time of day, day of week, week of month, and month of year.

Figure 4B:
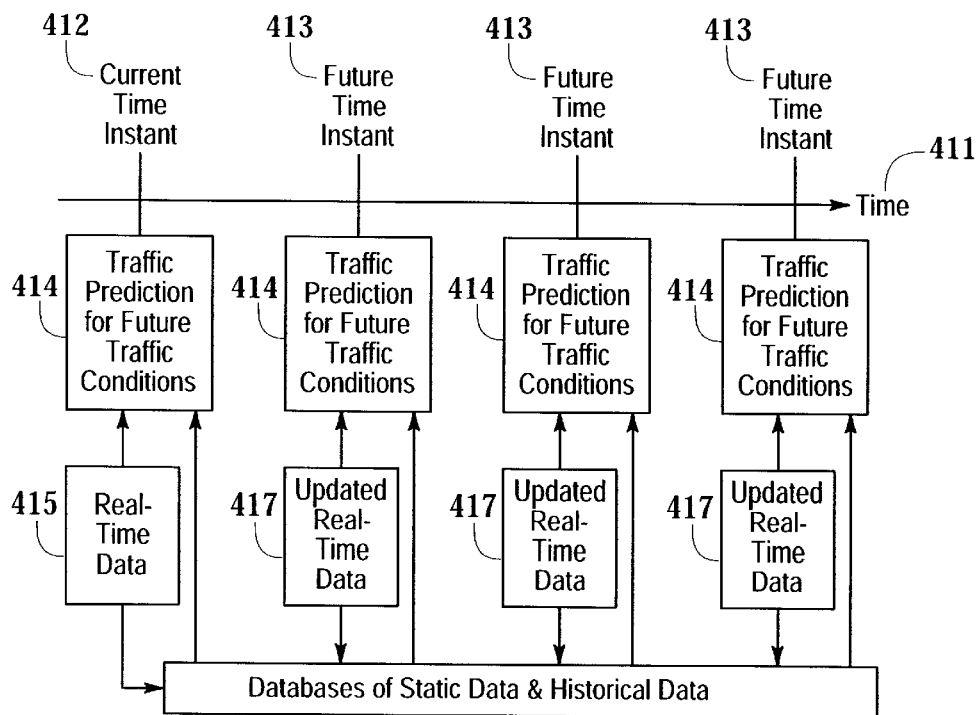
FIG. 4B illustrates traffic prediction for a rolling time horizon.

Since the traffic prediction is a continuous process, it needs to be provided in intervals of a plurality of minutes or hours or days. FIG. 4B illustrates the traffic prediction over a rolling time horizon. As indicated on the time 411 horizon, the traffic prediction procedure is executed for the current time instant 412 in order to provide the traffic prediction for future traffic conditions 414. In this prediction, the real-time data 415 are used to modify the historical traffic data in order to provide a better estimate and forecast for the short-term traffic conditions. In this forecast process, the databases of static data and historical data 416 are used as the basis and are updated using the real-time data 415. As time moves on to a future time instant 413, the real-time data 415 for the current time instant 412 become outdated and the updated real-time data 417 have to be used to modify the historical traffic data in order to provide a better estimate and forecast for the short-term traffic conditions. This rolling process will continue as time 411 moves on.

Using the traffic prediction models 8, the traffic forecast server 6 generates a set of basic output of predicted speeds and travel times 9. Similar to weather forecast, the traffic speed and travel time prediction is associated with a prediction probability. Furthermore, this prediction probability is further defined for each route segment and each time of prediction. Consequently, the prediction probability can be further determined for predictive travel times on each route, between each origin-destination pair, and each time of prediction.

Figure 5:
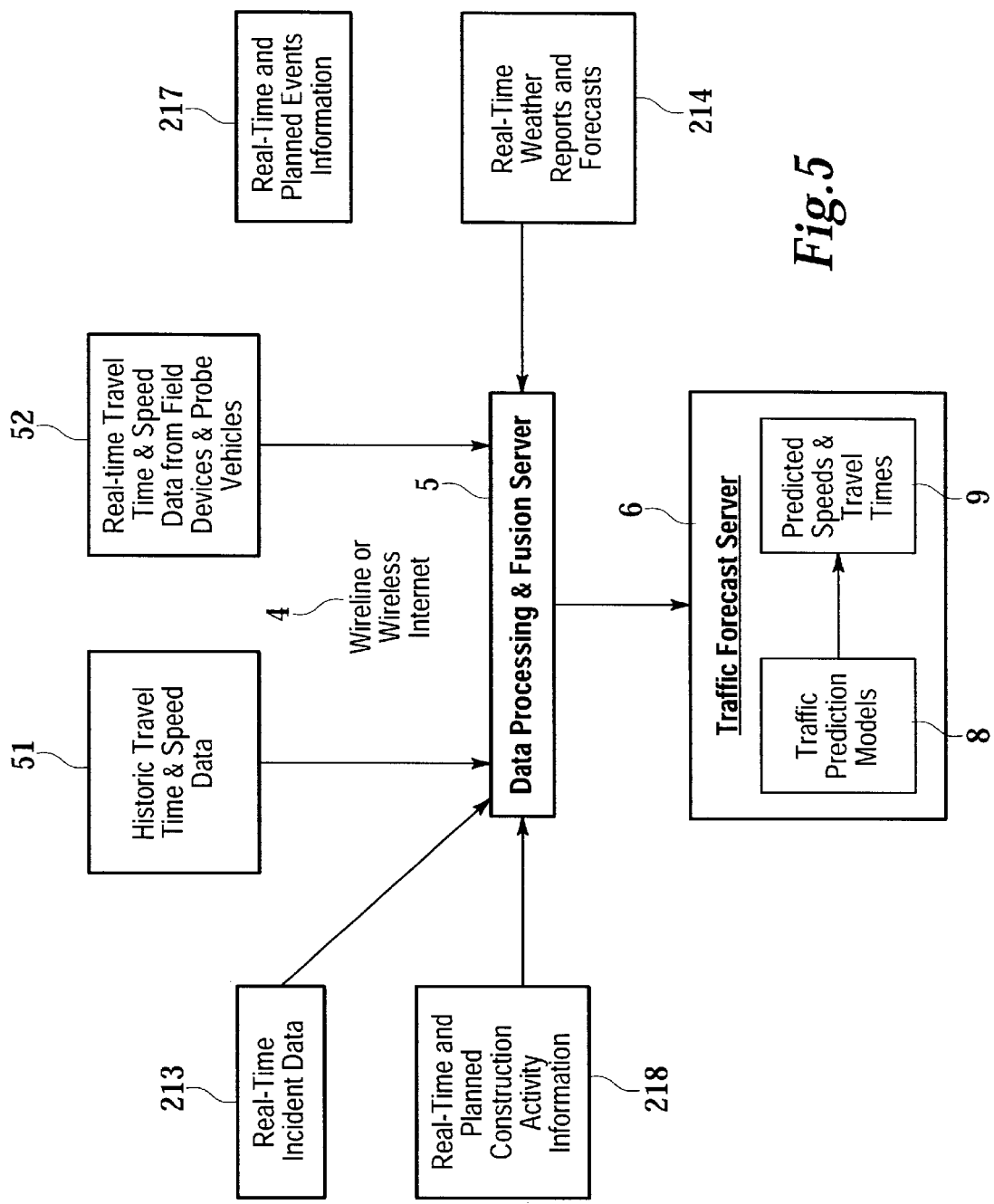
FIG. 5 illustrates a simplified Internet-based traffic prediction system.

Sometimes, the available traffic data is limited and a simplified traffic prediction system is needed. FIG. 5 illustrates a simplified Internet-based traffic prediction system. In this scenario, only historical travel time and speed data 51 are available and no other historical traffic data are available. The statistical models 44 and the heuristic models 45 can be used as traffic prediction models 8 in the traffic forecast server 6. The final output are the predicted speeds and travel times 9 on route segments for each predictive time instant. To refine the short-term traffic prediction, all real-time data can be applied, including real-time travel time and speed data from field devices and probe vehicles 52, real-time incident data 213, real-time and planned construction activity information 218, real-time and planned events information 217, and real-time weather reports and forecasts 214. Via the wireline and wireless Internet 4, these real-time data will be retrieved, processed and fused by the data processing and fusion server 5.

For longer-term forecast (e.g., next morning commute), the impact of real-time data will be diminishing. Instead, the weather forecasts, planned construction activity information, and planned events information will have more significant impact on the predictive speeds and travel times. Typically, adverse weather, planned construction and planned events will reduce the driving speeds and increase the travel times. The specific parameters for these impacts need to be calibrated using real-world data for different cities and areas.

Figure 6:
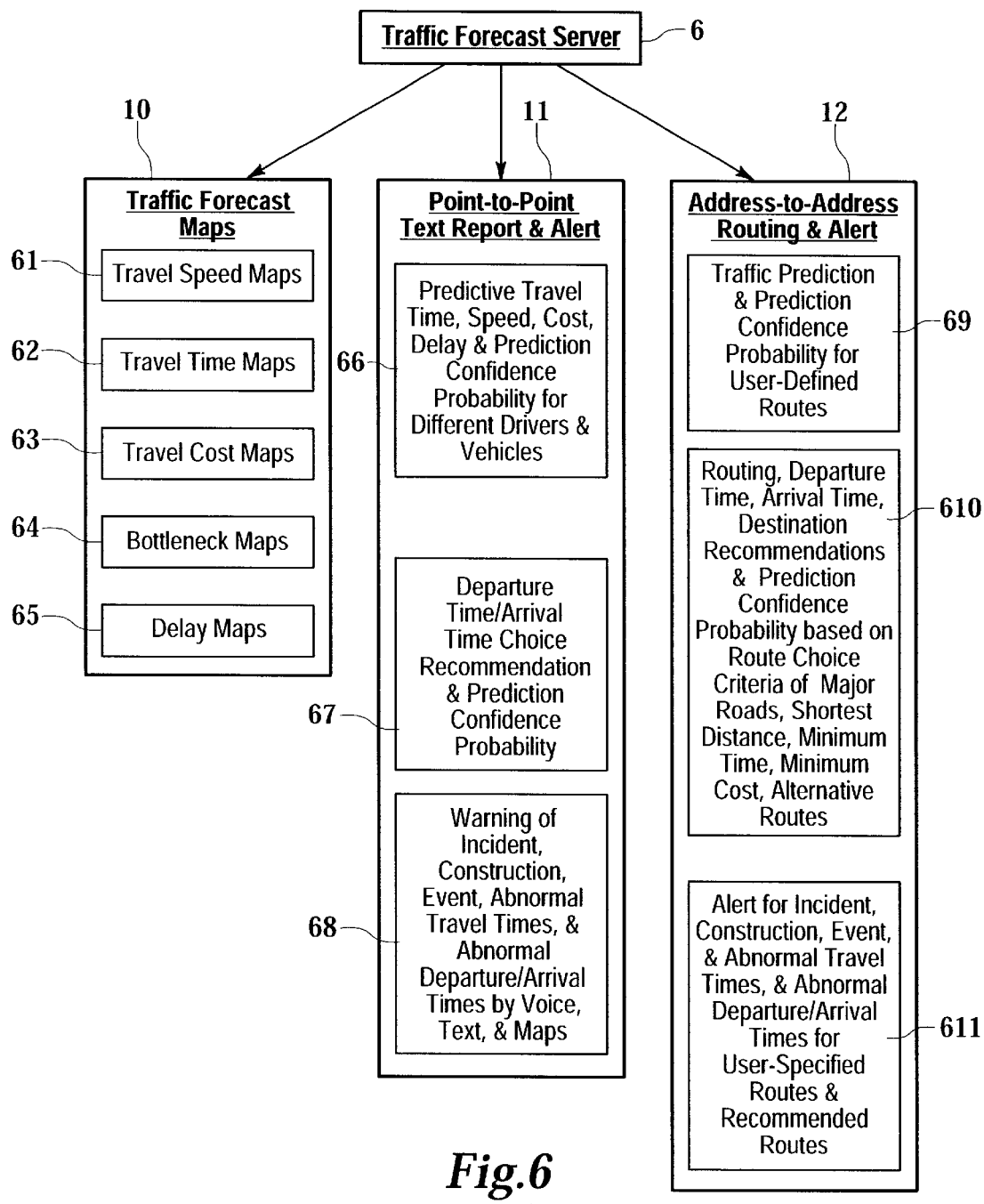
FIG. 6 summarizes the output data of the Internet-based traffic prediction system in accordance with an embodiment of the present invention.

The basic traffic prediction data can be used to generate various types of traffic forecast for motorists. FIG. 6 illustrates the three types of traffic prediction output: traffic forecast maps 10, point-to-point text report and alert 11, and address-to-address routing and alert 12. Examples of traffic forecast maps 10 and point-to-point text report and alert 11 can be found in website http://www.trafficcast.com. The traffic forecast maps 10 can be further personalized and customized based on different types of vehicles and different driver behavior. The types of vehicles typically include car, van, bus, and truck. The driver behavior can be defined based on the driver's level of aggressiveness, such as aggressive, neutral, and conservative driving behavior. A fuzzy logic can be used to define fuzzy-type driver behavior, which aggressive level is between very aggressive and very conservative. The types of vehicles and driver behavior are used to refine the traffic prediction due to the fact that heavy vehicles typically drive slower than light vehicles and conservative drivers drive slower than aggressive drivers, even when the average driving speeds are the same on one route segment. The types of vehicles and driver behavior will apply to point-to-point text report and alert 11 and address-to-address routing and alert 12.

Figure 7A:
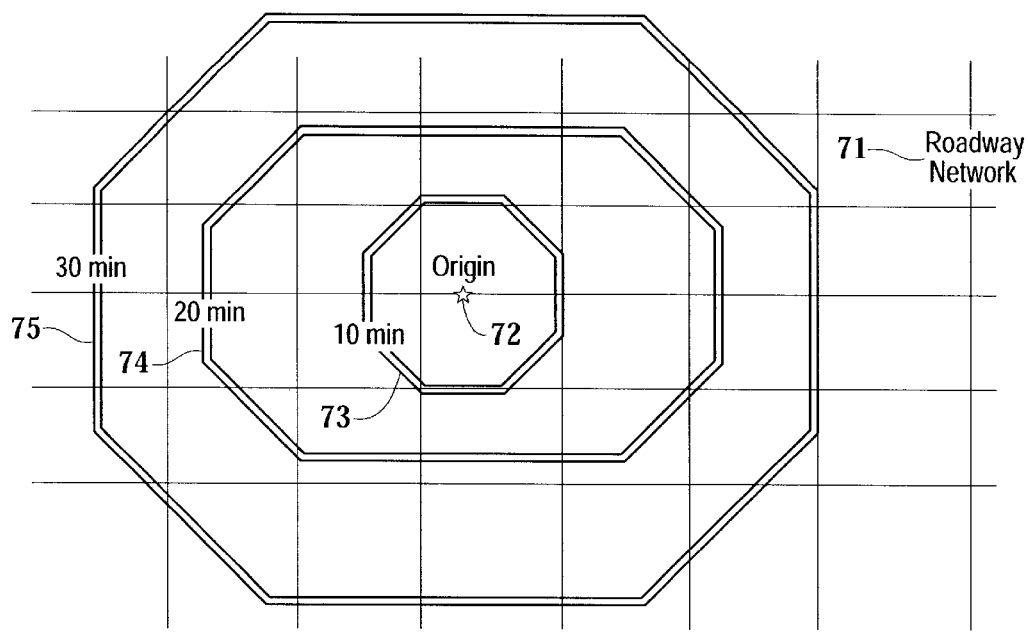
FIG. 7A illustrates the origin-based predictive travel time maps.

There are at least five types of traffic forecast maps 10 which can be produced: travel speed maps 61, travel time maps 62, travel cost maps 63, bottleneck maps 64, and delay maps 65. The travel speed maps 61 are also termed congestion maps, which use different colors to illustrate different predictive speeds on route segments. FIG. 7A illustrates the origin-based predictive travel time map. In an origin-based travel time map, an origin 72 is first defined on a route segment network 71. Then, a contour line is used to represent the predictive minimum travel time from the origin 71 to the contour line. As shown in FIG. 7A, the three contour lines 73–75 represent predictive minimum travel times—10 minutes, 20 minutes, and 30 minutes, respectively. This travel time map can be developed for each departure time from the origin 72. If the departure time is specified for the origin 72, each contour line will represent the earliest arrival time for traveling from the origin 72 to the contour line.

Figure 7B:
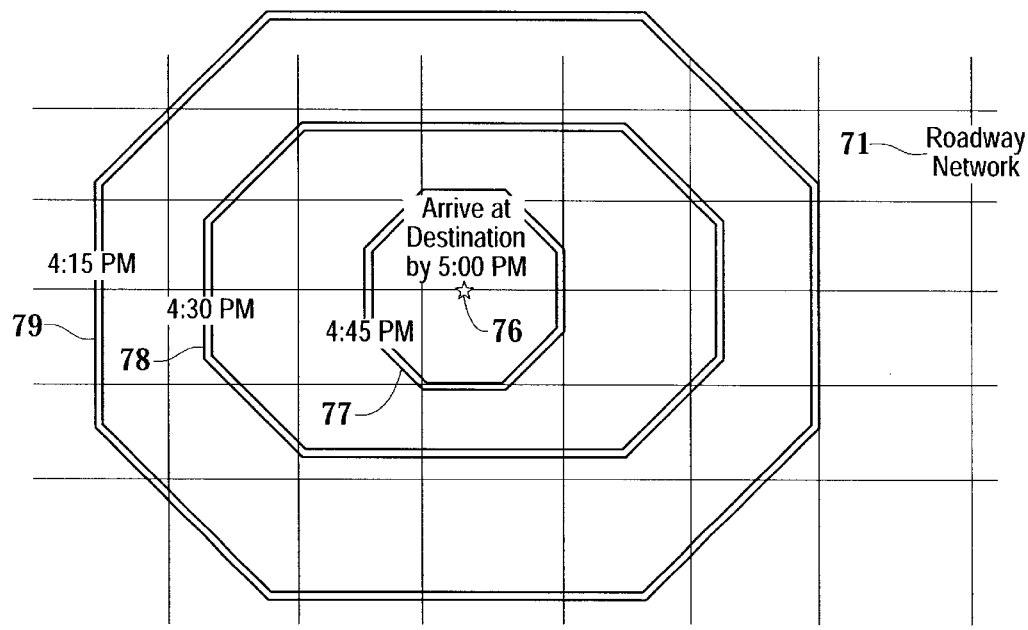
FIG. 7B illustrates the destination-based predictive travel time maps.

If the origin 72 is replaced by a destination 76, the desired arrival time has to be specified. FIG. 7A illustrates the destination-based predictive travel time map. As indicated in FIG. 7B, in order to arrive at the destination by 5PM 76, motorists have to leave each contour line at 4:45PM 77, 4:30PM 78, and 4:15PM 79, respectively. These times are also the latest time for motorists to leave in order to arrive at the destination by 5PM 76. On the other hand, each contour line can also represent the predictive minimum travel time to arrive at the destination.

The travel cost maps 63 are similar to the travel time maps 62. For an origin-based travel cost map, each contour line represents the minimum travel cost from the origin to the contour line for each departure time at the origin 72. For a destination-based travel cost map, each contour line represents the minimum travel cost from the contour line to the destination 76 for each desired arrival time at the destination 76. The bottleneck maps 64, use colors (red or yellow) to highlight the route segments with low predictive travel speeds. The delay maps 65 are similar to the travel time maps 62. For traveling from point A to point B, the delay is defined as the difference between the predictive travel time and the free-flow travel time without congestion. For an origin-based delay map, each contour line represents the minimum delay from the origin to the contour line for each departure time at the origin 72. For a destination-based delay map, each contour line represents the minimum delay from the contour line to the destination 76 for each desired arrival time at the destination 76.

As shown in FIG. 6, the point-to-point text report and alert 11 provides three types of point-to-point, route-specific information: 1) predictive travel time, speed, cost, delay and prediction confidence probability for different drivers and vehicles 66; 2) departure time/arrival time choice recommendations and prediction confidence probability 67; and 3) warning of incident, construction, event, abnormal travel times, and abnormal departure time/arrival times by voice, text, and maps 68.

Figure 8:
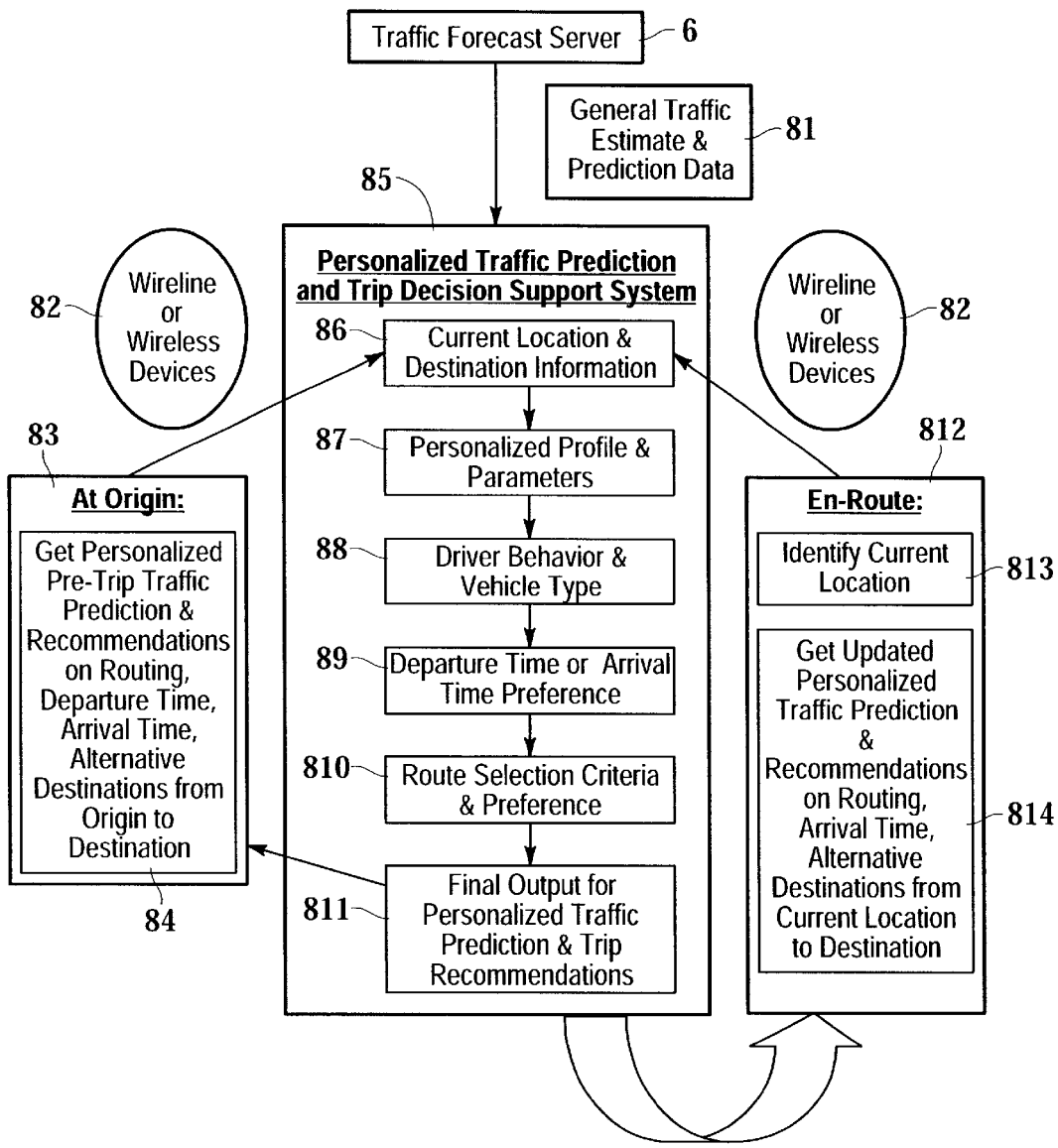
FIG. 8 illustrates the system architecture of an Internet-based personalized traffic prediction and trip decision support system.
Figure 9:
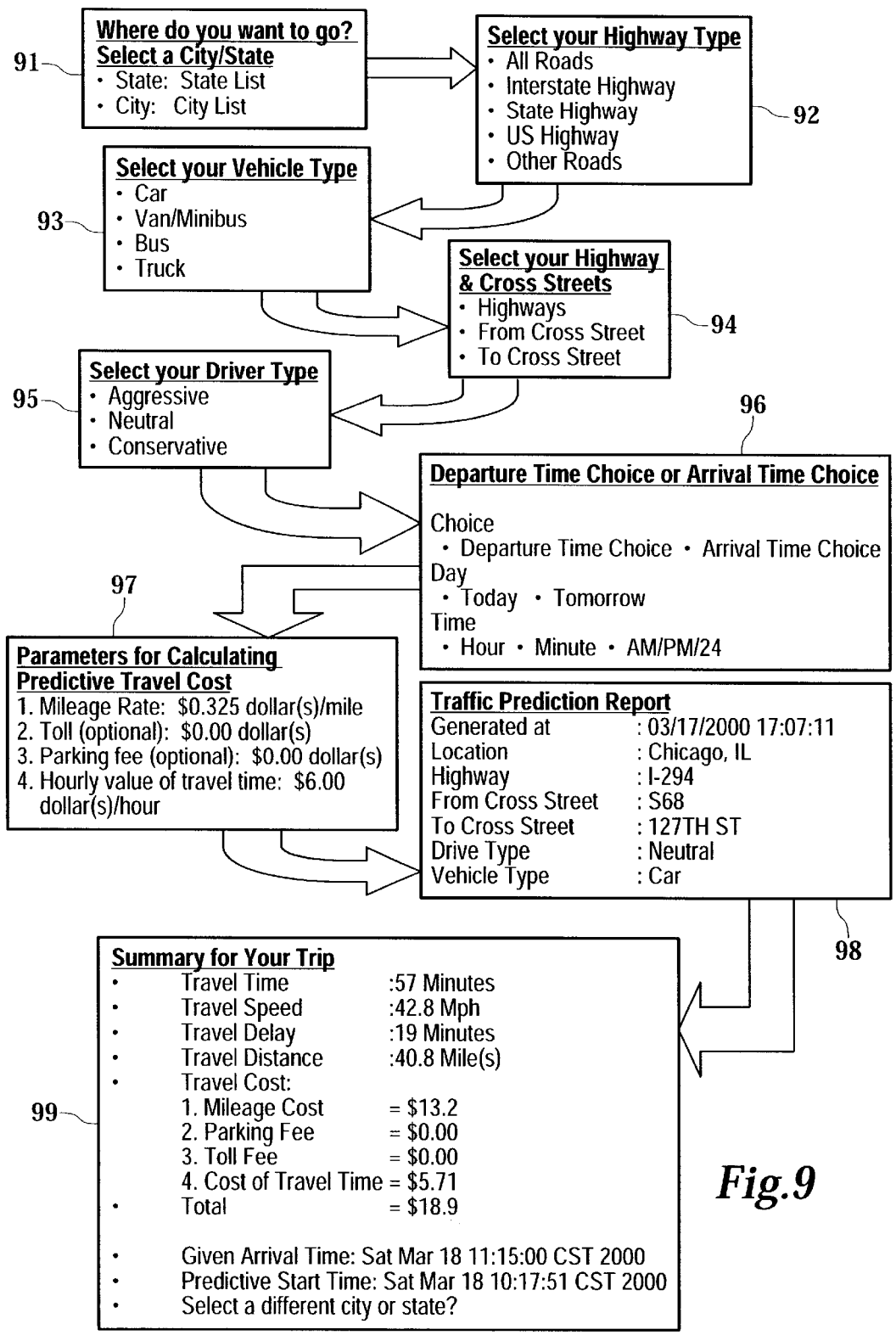
FIG. 9 shows the user-input process and final output example of the text report of the Internet-based personalized traffic prediction and trip decision support system in accordance with an embodiment of the present invention.

The text report is further illustrated by FIG. 8 and FIG. 9. FIG. 8 illustrates the system architecture of an Internet-based personalized traffic prediction and trip decision support system 85. Using the general traffic estimate and prediction data 81 generated by the traffic forecast server 6 as the basis, the Internet-based personalized traffic prediction and trip decision support system 85 produces personalized, point-to-point traffic prediction and routing recommendations. This system can be located in a central server or be located in a user device, such as in-vehicle computer, palm, or desktop.

When a traveler is at his/her origin 83, his/her current location and destination information 86 will be provided to the personalized traffic prediction and trip decision support system 85 via wireline or wireless devices 82. Furthermore, the motorist is required to input his/her personalized profile and parameters 87, including preferred devices, account number, and password to receive personalized predictive traffic information. Subsequently, the user is required to input his/her driver type and vehicle type 88, departure time or arrival time preference 89, and route selection criteria and preference 810. At the last step, the final output for personalized traffic prediction and trip recommendations 811 can be generated. The final output also contains a summary of the historical statistics for the user, if the same route was used before. Therefore, the personalized traffic prediction information and alert may be pushed to the motorist based on user's preferred schedule or be received by the user whenever the user wants it. In this way, a pre-trip user can get personalized pre-trip traffic prediction and recommendations on routing, departure time, arrival time, alternative destinations from origin to destination 84.

While en-route 812, various location technologies, such as GPS, can be used to identify the current location 813 of the user. The current location information can be sent back to the personalized traffic prediction and trip decision support system 85. Instead, the user can also input the current location using voice or text. If the user has selected all the personalized profiles and parameters before the trip, the user can use an account and password to retrieve this saved information so that the personalized traffic prediction and trip decision support system 85 re-compute the updated traffic prediction and routing recommendations from the current location to destination. On the other hand, the user can also allow the wireline or wireless devices 82 to do all of these tasks. The user only needs to confirm some of the key selections via voice or text command. In this way, the en-route motorist can get updated personalized traffic prediction and recommendations on routing, arrival time, alternative destinations from current location to destination 814.

FIG. 9 shows the user-input process and final output example of the text report of the Internet-based personalized traffic prediction and trip decision support system. At the beginning, the user is asked to input his/her state and city selection from the menu "Where do you want to go? Select a City/State" 91. Then, in the menu "Select your Highway Type" 92, the used is asked to input the type of highway he/she will be driving on. The types of highway available include all roads, interstate highway, state highway, US highway, and other roads. The next menu is "Select your Vehicle Type" 93. The types of vehicles include car, van/mini bus, bus, and truck. Subsequently, the user is asked to identify the highway names, origin (from cross street), and destination (to cross street) in the menu "Select your Highway & Cross Streets" 94. The next menu is "Select your Driver Type" 95. The driver types include aggressive, neutral, and conservative. The user is also asked to identify either a preferred departure time or a preferred arrival time in the menu "Departure Time Choice or Arrival Time Choice" 96. The user can input any time today or tomorrow as the preferred departure time or arrival time. Moreover, the user can modify the "Parameters for Calculating Predictive Travel Cost" 97, including mileage cost, toll, parking fee, and hourly value of travel time. With the above input, a traffic prediction report 98 can be generated. This report provides a predictive "Summary for Your Trip" 99, including travel time, travel speed, travel delay, travel distance, travel cost, arrival time, and start time (or departure time).

As shown in FIG. 6, the address-to-address routing and alert 12 provide three types of information: 1) traffic prediction and prediction confidence probability for user-defined routes 69; 2) routing, departure time, arrival time, destination recommendations and prediction confidence probability based on route choice criteria of major roads, minimum time, minimum cost, alternative routes 610; and 3) alert for incident, construction, event, abnormal travel times, and abnormal departure time/arrival times for user-specified routes and recommended routes 611.

Figure 10A:
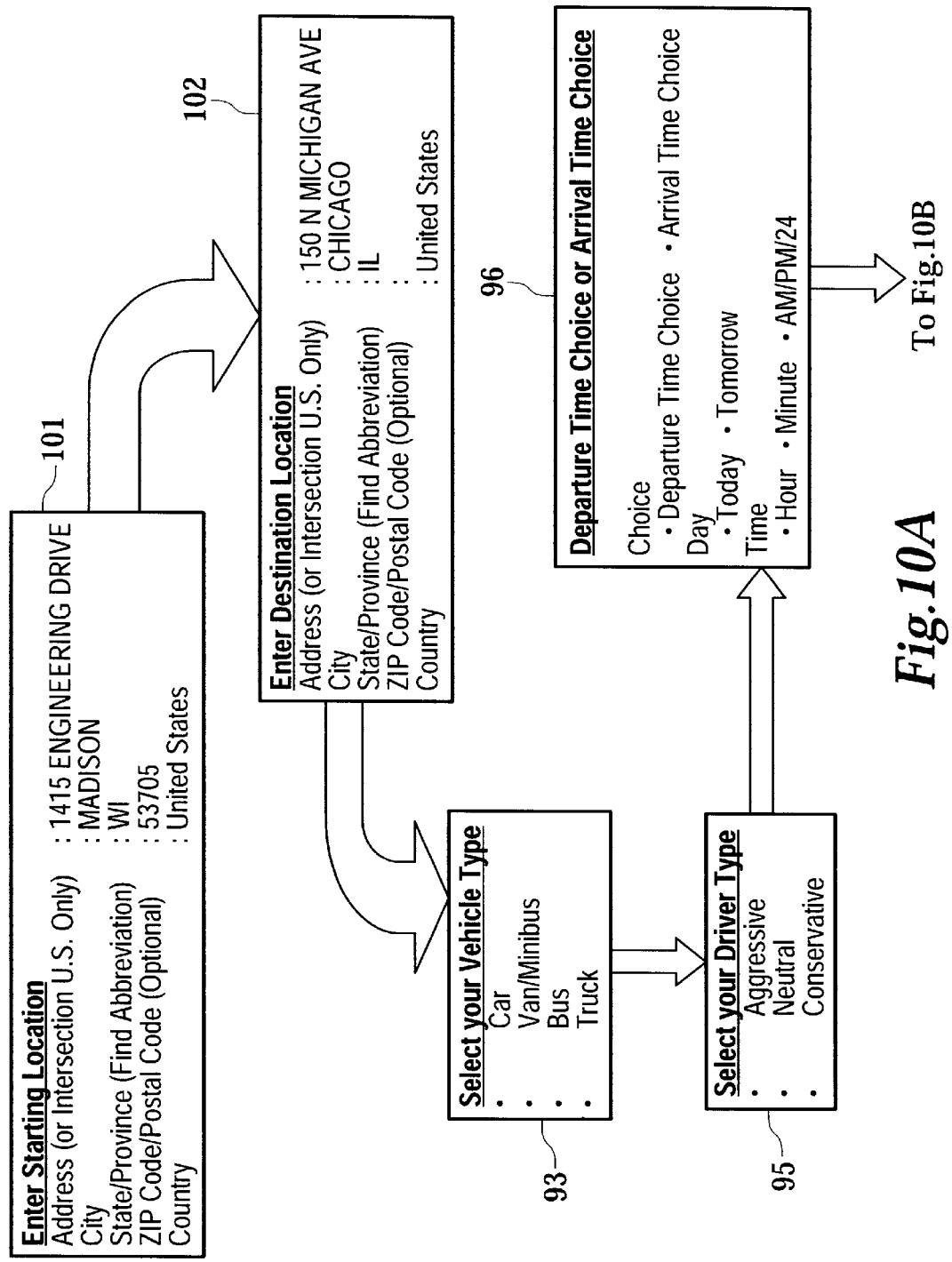
FIG. 10 shows the user-input process and final output example of the address-based routing of the Internet-based personalized traffic prediction and trip decision support system in accordance with an embodiment of the present invention.
Figure 10B:
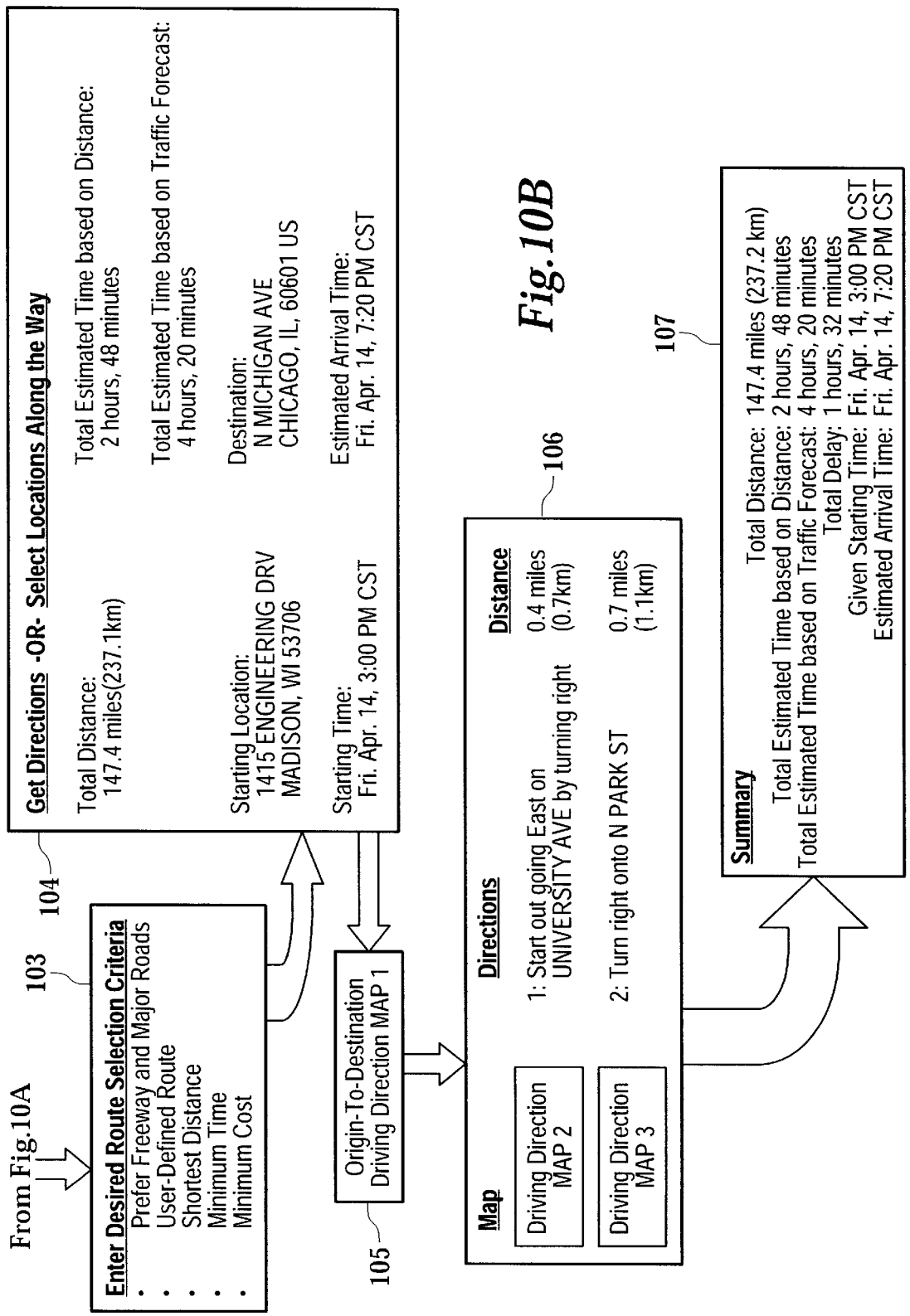

FIG. 10 shows the user-input process and final output example of the address-based routing of the Internet-based personalized traffic prediction and trip decision support system. At the beginning, the user is asked to "Enter Starting Location" 101 and to "Enter Destination Location" 102 in address format. The next menu is "Select your Vehicle Type" 93. The types of vehicles include car, van/mini bus, bus, and truck. Subsequently, the user is asked to "Select your Driver Type" 95. The driver types include aggressive, neutral, and conservative. The user is also asked to identify either a preferred departure time or a preferred arrival time in the menu "Departure Time Choice or Arrival Time Choice" 96. Moreover, the user can select a route choice criterion in the menu "Enter Desired Route Selection Criteria" 103. The available route choice criteria include: 1) prefer freeway and major roads, 2) user-defined route, 3) shortest distance, 4) minimum time, and 5) minimum cost. With the above input, a predictive routing report and driving direction maps can be generated. In the first part "Get Direction or Select Location Along the Way" 104, this predictive routing report provides the total distance traveled, total estimated travel times based on distance and based on traffic forecast, starting time, and arrival time. Then, an origin-to-destination driving direction map 105 is provided. The turn-by-turn driving directions and maps 106 can also be provided. Finally, a predictive trip "Summary" 107 provides information on total distance, total estimated travel times based on distance, total estimated travel times based on traffic forecast, total delay, given starting time, and estimated arrival time.

Figure 11:
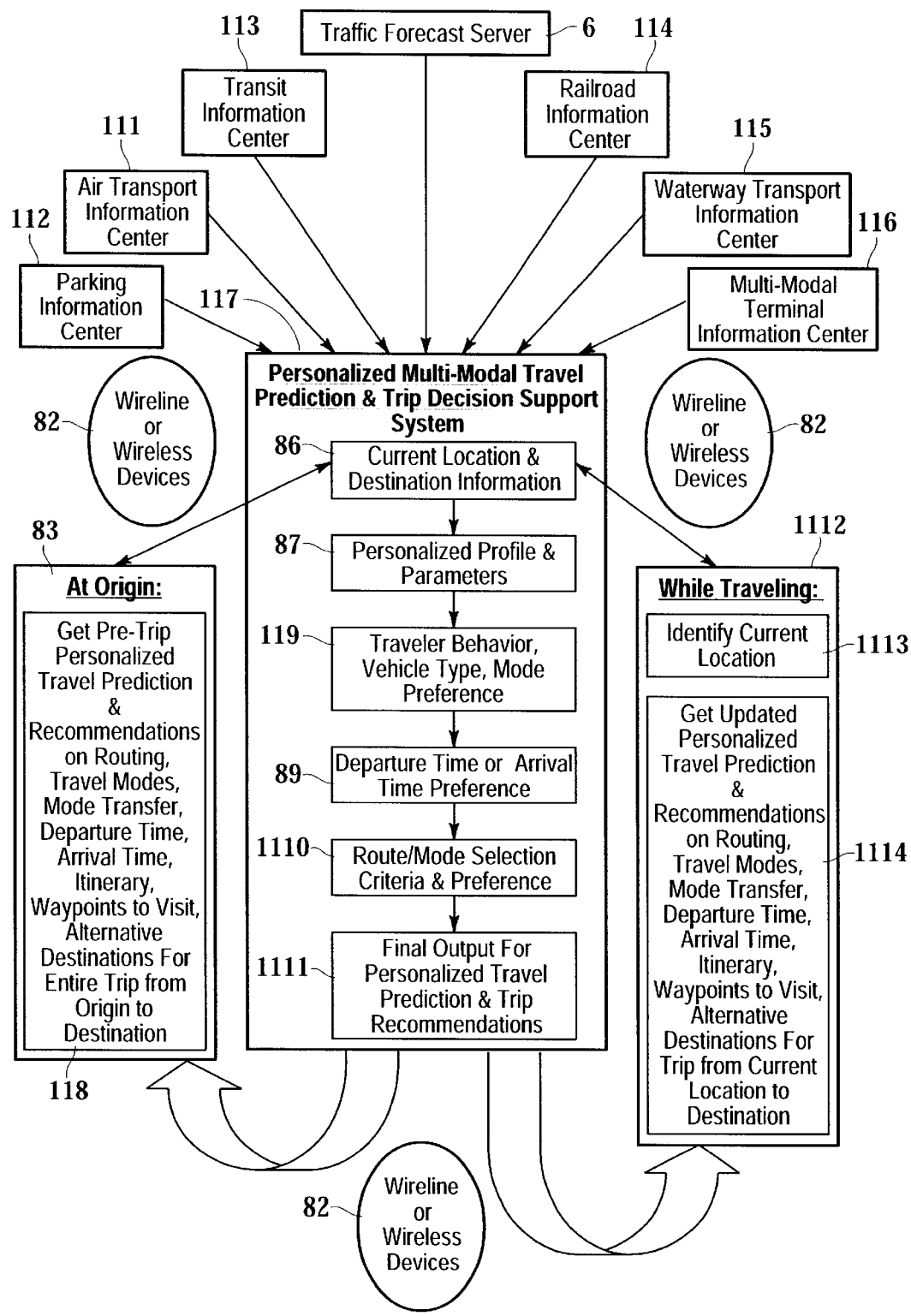
FIG. 11 illustrates the system architecture of an Internet-based personalized travel prediction and decision support system for a multi-modal transportation network.

The Internet-based personalized traffic prediction and trip decision support system 85 can be applied to a multi-modal transportation network. In such a network, a traveler may need to use one or a plurality of transport modes and intermodal transfer facilities. These modes include automobile, railroad, transit, air transport, and waterway transport. FIG. 11 illustrates the system architecture of an Internet-based personalized multi-modal travel prediction and decision support system 117. Again, this system can be located in a central server or a user device, include in-vehicle computer, hand-held computer, or desktop computer. The route segment traffic prediction information generated by the traffic forecast server 6 is still used as the major basis. In addition, the transit information center 113 and the railroad information center 114 will provide transit and train schedule, real-time status, and predictive arrival time at each station. The air transport information center 111 will provide flight information, real-time status, predictive departure time/arrival time, and delay. The parking information center 112 will provide the available parking space at different parking facilities. The waterway transport information center 115 will provide water transport schedule, real-time status, and delay. The multi-modal terminal information center 116 will provide information on planned connections among transport modes, connection schedules, real-time status, and delays.

The above multi-modal information is transmitted to the personalized multi-modal travel prediction and decision support system 117 via wireline or wireless Internet 4 so that this system produces personalized, point-to-point travel prediction and itinerary recommendations. This system can be located in a central server or be located in a user device, such as in-vehicle computer, palm, or desktop.

When a traveler is at his/her origin 83, his/her current location and destination information 86 will be provided to the personalized multi-modal travel prediction and decision support system 117 via wireline or wireless devices 82. Furthermore, the traveler is required to input his/her personalized profile and parameters 87, including preferred devices, account number, and password, (the account number and password constituting a user identifier) to receive personalized predictive traffic information. Subsequently, the user is required to input his/her data on traveler behavior, vehicle type, mode preference 119, departure time or arrival time preference 89, and route/mode selection criteria and preference 1110. At the last step, the final output for personalized travel prediction and trip recommendations 1111 can be generated. The final output also contains a summary of the historical statistics for the user, if the same route/mode and itinerary were used before. Therefore, the personalized travel prediction information and alert may be pushed to the traveler based on user's preferred schedule or be received by the user whenever the user wants it. To accomplish this the personalized travel prediction information is associated with a user identifier in such a way as to transmit the information to the user. In this way, a pre-trip user can get pre-trip personalized travel prediction and recommendations on routing, travel modes, mode transfer, departure time, arrival time, itinerary, waypoints to visit, alternative destinations from entire trip origin to destination 118.

While en-route 1112, various location technologies, such as GPS, can be used to identify the current location 1113 of the user. The current location information can be sent back to the personalized multi-modal travel prediction and decision support system 117. On the other hand, the user can also input the current location using voice or text. If the user has selected all the personalized profiles and parameters before the trip, the user can use an account and password or user identifier to retrieve this saved information so that the personalized multi-modal travel prediction and decision support system 117 re-computes the updated travel prediction and itinerary recommendations from the current location to destination. Thus information related to predicting the trip time is associated with the user identifier, so it can be, and is transmitted to the user, over the Internet or by other means. On the other hand, the user can also allow the wireline or wireless devices 82 to do all of these tasks. The user only needs to confirm some of the key selections via voice or text command. In this way, the en-route traveler can get updated personalized travel prediction and recommendations on routing, travel modes, mode transfer, departure time, arrival time, itinerary, waypoints to visit, alternative destinations for trip from current location to destination 1114.

Figure 12:
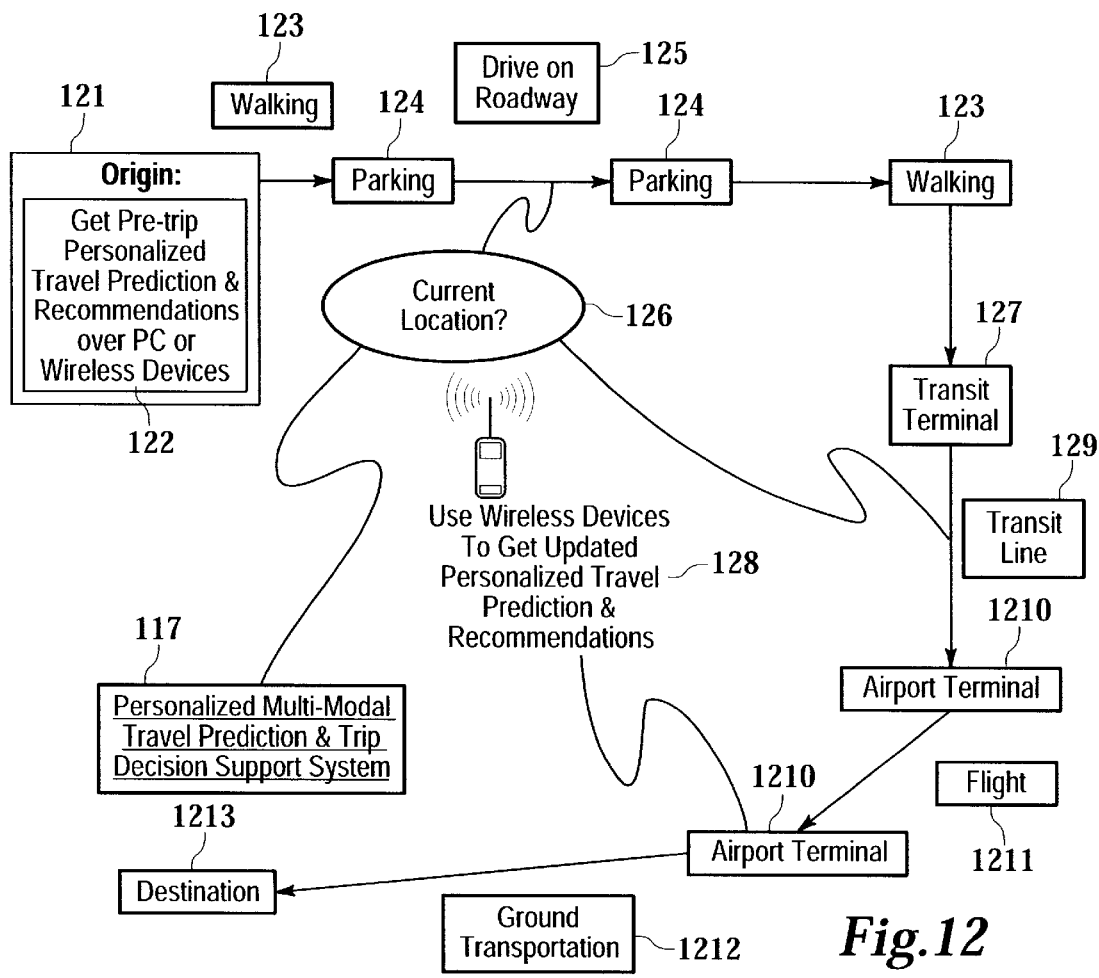
FIG. 12. shows the information flow process and example of an Internet-based personalized travel prediction and decision support system for a multi-modal transportation network in accordance with an embodiment of the present invention.

FIG. 12 shows the information flow process and a business trip example of an Internet-based personalized travel prediction and decision support system for a multi-modal transportation network. This business trip comprises automobile, transit, and air transport as well as intermodal transfer at parking, transit terminal, and airport. Initially, when the traveler is at his/her origin 121, he/she can get pre-trip personalized travel prediction and recommendations over PC or wireless devices 112. After walking 123 to his/her parking 124 lot, he/she starts to drive on route segment 125 towards the remote parking 124 lot at the airport. During his/her driving, his/her car can report his/her current location 126 so that he/she can use wireless devices to get updated personalized travel prediction and recommendations 128 from the personalized multi-modal travel prediction and trip decision support system 117. This updated information could include additional driving delay on the route segment, updated arrival time estimate at the airport, and updated flight departure time and possible delay.

After walking 123 from the remote parking 124 lot to the transmit terminal 127, the traveler takes an airport transit line 129 and arrives at the airport terminal 1210. With a flight 1211, the traveler arrives at the airport terminal 1211 closer to his/her destination 1213. He/she can use the ground transportation 1212 at the destination city to arrive at his/her destination 1213. During the trip, the traveler can connect to the personalized multi-modal travel prediction and trip decision support system 117 at any time and at any place so that he/she can get the updates about his/her travel prediction and itinerary recommendations.

It should be understood that the user will make a request in combination with a user identifier which may be an account and password or simply the Internet cookie or other identifier attached by the device which transmits the user's request for information. The information generated by the traffic information system of this invention, which is specific to a particular user, is transmitted in association with the user identifier so that the information returns to the user who made a specific request.

It should be understood that nominal route velocity, means the velocity along a route segment based on historical data, for a similar day, at a similar time.

It is understood that the invention is not limited to the particular construction and arrangement of parts herein illustrated and described, but embraces such modified forms thereof as come within the scope of the following claims.

I claim:

1. A method of predicting traffic conditions on a route segment at a future time comprising the steps of:

for a selected future time, determining the expected nominal route velocity for a selected route segment;

for the selected route segment determining at least one weather prediction region which contains the route segment;

for the selected future time determining predicted weather conditions within the at least one weather prediction region;

producing an adjusted route velocity for the route segment by applying a function to the nominal route velocity which includes as parameters the predicted weather conditions within the at least one weather prediction region to produce an adjusted route velocity which is less than the nominal route velocity.

2. The method of claim 1 wherein the weather prediction regions are counties.

3. The method of claim 1 wherein the function comprises a lookup table containing factors of a value of less than one for specific forecasted weather conditions.

4. The method of claim 1 wherein weather prediction with respect to the weather prediction region is obtained over the Internet.

5. The method of claim 1 wherein the adjusted route velocity comprises a range which is consistent with the probabilistic range of the predicted weather conditions.

6. A method of providing predicted trip times between an origin and a destination comprising the steps of:

receiving over the Internet a request for travel time, including an origin, a destination, a trip start time, and a user identifier;

determining a route between the origin and the destination, comprised of at least one route segment;

determining a predicted speed over the at least one route segment based on historical data for travel speeds over said route segment during good driving weather during a similar time period;

determining at least one weather prediction region encompassing the route between the origin and the destination;

determining predicted weather conditions within the weather prediction region at the time in proximity to the start time;

for the predicted weather conditions determine a weather delay factor;

determining a predicted trip time based on historical data for travel speeds, adjusted by the weather delay factor;

transmitting the predicted trip time in association with the user identifier.

7. The method of claim 6 wherein the weather prediction regions are counties.

8. The method of claim 6 wherein the weather delay factor is determined with a lookup table containing factors having a value of less than one for specific forecasted weather conditions.

9. The method of claim 6 wherein weather predicted conditions with respect to the weather prediction region is obtained over the Internet.

10. The method of claim 6 wherein the predicted trip time comprises a range of times which is consistent with the probabilistic range of the predicted weather conditions.

11. A method of providing predicted trip times between an origin and a destination comprising the steps of:

receiving over the Internet a request for travel time, including an origin, a destination, a trip start time, a user identifier, and a user specific factor;

determining a route between the origin and the destination, comprised of at least one route segment; determining at least one weather prediction region encompassing the route between the origin and the destination;

determining a predicted speed over the at least one route segment, based on the start time;

determining a predicted trip time adjusted by the user specific factor;

transmitting the predicted trip time in association with the user identifier.

12. The method of claim 11 wherein the user specific factor is a type of vehicle being driven by the user.

13. The method of claim 11 wherein the user specific factor is a behavioral characteristic of the user.

14. The method of claim 11 wherein the step of determining a predicted trip time includes:

determining predicted weather conditions within the weather prediction region at a time in proximity to the start time;

for the predicted weather conditions determining a weather delay factor; and determining the predicted trip time, and adjusting by the weather delay factor.

15. The method of claim 14 wherein the function comprises a lookup table containing factors having a value of less than one for specific forecasted weather conditions.

16. The method of claim 14 wherein weather prediction with respect to the weather prediction region is obtained over the Internet.

17. The method of claim 14 wherein the adjusted route velocity comprises a range which is consistent with the probabilistic range of the predicted weather conditions.

18. The method of claim 14 wherein the weather prediction regions are counties.

19. A method of providing predicted trip times between an origin and a destination comprising the steps of:

receiving over the Internet a request from the user for travel time, including an origin, a destination, a trip start time, and a user identifier;

determining a route between the origin and the destination, comprised of at least one route segment;

determining a predicted speed over the at least one route segment based on historical data for travel speeds over said route segment during a similar time period;

determining at least one scheduled event causing a traffic flow on the route segment between the origin and the destination;

for the predicted event determining a delay factor;

determining a predicted trip time based on historical data for travel speeds, adjusted by the delay factor;

transmitting the predicted trip time in association with the user identifier to the user.

20. A method of providing predicted trip times between an origin and a destination comprising the steps of:

receiving over the Internet a request for travel time, including an origin, a destination, a trip start time, and a user identifier;

determining a route between the origin and the destination, comprised of at least one route segment;

determining a predicted traffic flow over the at least one route segment based on historical data for traffic flow over said route segment during a similar time period;

determining at least one scheduled event causing decreased capacity on the route segment between the origin and the destination;

for the predicted event determining a delay factor, based on predicted traffic flow and a historic capacity adjusted by the event caused decreased capacity;

determining a predicted trip time based on historical data for travel speeds, adjusted by the delay factor;

transmitting the predicted trip time in association with the user identifier.

* * * * *